US010235106B2

(12) United States Patent
Shirasaka et al.

(10) Patent No.: US 10,235,106 B2
(45) Date of Patent: Mar. 19, 2019

(54) INFORMATION PROCESSOR, IMAGE FORMING APPARATUS, IMAGE FORMING METHOD, AND IMAGE FORMING SYSTEM

(71) Applicant: Oki Data Corporation, Tokyo (JP)

(72) Inventors: Mitsuyoshi Shirasaka, Tokyo (JP); Hiroshi Kato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/709,428

(22) Filed: Sep. 19, 2017

(65) Prior Publication Data

US 2018/0081604 A1  Mar. 22, 2018

(30) Foreign Application Priority Data

Sep. 21, 2016  (JP) .................. 2016-184091
Feb. 16, 2017  (JP) .................. 2017-026845

(51) Int. Cl.
G06K 15/02 (2006.01)
G06K 15/16 (2006.01)
G06F 3/12 (2006.01)
G06K 15/00 (2006.01)

(52) U.S. Cl.
CPC .......... *G06F 3/1219* (2013.01); *G06F 3/1208* (2013.01); *G06F 3/1225* (2013.01); *G06F 3/1251* (2013.01); *G06F 3/1286* (2013.01); *G06K 15/024* (2013.01); *G06K 15/16* (2013.01); *G06K 15/404* (2013.01)

(58) Field of Classification Search
CPC ..... G06K 15/024; G06K 15/16; G06F 3/1251
See application file for complete search history.

(56) References Cited

U.S. PATENT DOCUMENTS

| 2002/0164185 | A1* | 11/2002 | Horiuchi | B41J 11/42 400/76 |
| 2002/0171871 | A1* | 11/2002 | Catt | G06K 15/02 358/1.18 |
| 2002/0172539 | A1* | 11/2002 | Iwamura | B41J 11/42 400/582 |
| 2003/0227652 | A1* | 12/2003 | Masaki | H04N 1/387 358/1.18 |
| 2007/0091354 | A1* | 4/2007 | Sakemi | G06F 17/211 358/1.15 |

(Continued)

FOREIGN PATENT DOCUMENTS

JP  2003-011466 A  1/2003
JP  2016-132203 A  7/2016

*Primary Examiner* — Ted W Barnes
(74) *Attorney, Agent, or Firm* — Rabin & Berdo, P.C.

(57) ABSTRACT

An information processor includes an image data generating circuitry and a communicator. The image data generating circuitry includes a logical page generating circuitry and a page adjusting circuitry, and generates image data. The logical page generating circuitry generates a plurality of logical pages each containing a plurality of pages. The page adjusting circuitry adjusts number of pages of the plurality of pages contained in a first logical page of the plurality of logical pages. The image data contains the plurality of logical pages. The communicator transmits the image data to an image forming unit. The image forming unit is able to cut a recording medium by using the logical pages as a reference, and forms an image on the recording medium by using the logical pages as a reference.

18 Claims, 27 Drawing Sheets

(56) References Cited

U.S. PATENT DOCUMENTS

| | | | |
|---|---|---|---|
| 2008/0137139 A1* | 6/2008 | Yamada | G06F 3/1208 358/1.15 |
| 2008/0158599 A1* | 7/2008 | Miwa | G06F 3/1205 358/1.15 |
| 2008/0159800 A1* | 7/2008 | Wada | B26D 5/005 400/621 |
| 2008/0292379 A1* | 11/2008 | Tsuchiya | G03G 15/50 399/401 |
| 2009/0168094 A1* | 7/2009 | Horiuchi | G06F 3/1204 358/1.15 |
| 2011/0037990 A1* | 2/2011 | Unno | G03G 15/50 358/1.5 |
| 2011/0075187 A1* | 3/2011 | Imine | H04N 1/00442 358/1.14 |
| 2011/0187802 A1* | 8/2011 | Fujio | B41F 13/62 347/104 |
| 2011/0286012 A1* | 11/2011 | De Munck | B41J 3/4075 358/1.6 |
| 2012/0321187 A1* | 12/2012 | Yamaji | H04N 1/00137 382/173 |
| 2013/0169977 A1* | 7/2013 | Murata | H04N 1/387 358/1.2 |
| 2015/0165793 A1* | 6/2015 | Shimura | B41J 11/663 347/16 |
| 2015/0314618 A1* | 11/2015 | Ohashi | B41J 11/663 347/16 |
| 2016/0247047 A1* | 8/2016 | Shirasaka | G06K 15/022 |
| 2016/0335032 A1* | 11/2016 | Matsumoto | G06F 3/125 |
| 2017/0182804 A1* | 6/2017 | Kako | B41J 11/663 |

* cited by examiner

INFORMATION PROCESSOR, IMAGE FORMING APPARATUS, IMAGE FORMING METHOD, AND IMAGE FORMING SYSTEM

CROSS REFERENCE TO RELATED APPLICATIONS

The present application claims priority from Japanese Patent Application No. 2016-184091 filed on Sep. 21, 2016, and Japanese Patent Application No. 2017-026845 filed on Feb. 16, 2017, the entire contents of each which are hereby incorporated by reference.

BACKGROUND

The technology relates to an information processor that generates print data, an image forming apparatus that forms an image, an image forming method that forms an image, and an image forming system that forms an image.

Some image forming apparatuses are able to perform printing on a recording medium that is long in one direction, in addition to a recording medium of a standardized size such as A3 and A4. For example, Japanese Unexamined Patent Application Publication No. 2003-11466 discloses an image forming apparatus that is able to perform long page printing. Further, for example, Japanese Unexamined Patent Application Publication No. 2016-132203 discloses an image forming apparatus that cuts a paper label roll while forming an image on the paper label roll.

SUMMARY

It is desired to efficiently utilize, in an image forming apparatus, a recording medium without wasting the recording medium.

It is desirable to provide an information processor, an image forming apparatus, an image forming method, and an image forming system, that each allow for efficient utilization of a recording medium.

According to one embodiment of the technology, there is provided an information processor including an image data generating circuitry and a communicator. The image data generating circuitry includes a logical page generating circuitry and a page adjusting circuitry, and generates image data. The logical page generating circuitry generates a plurality of logical pages each containing a plurality of pages. The page adjusting circuitry adjusts number of pages of the plurality of pages contained in a first logical page of the plurality of logical pages. The image data contains the plurality of logical pages. The communicator transmits the image data to an image forming unit. The image forming unit is able to cut a recording medium by using the logical pages as a reference, and forms an image on the recording medium by using the logical pages as a reference.

In one embodiment, the image forming unit may be an image forming apparatus that is provided outside the information processor and separately from the information processor. In another embodiment, the information processor may include the image forming unit and may also serve as an image forming apparatus that forms an image.

According to one embodiment of the technology, there is provided an image forming method including: generating, with an image data generating circuitry, image data, by causing the image data generating circuitry to generate a plurality of logical pages each containing a plurality of pages and adjust number of pages of the plurality of pages contained in a first logical page of the plurality of logical pages, the image data containing the plurality of logical pages; cutting, with a cutter, a recording medium, the cutter being able to cut the recording medium by using the logical pages as a reference; and forming, with an image forming unit, an image on the recording medium by using the logical pages as a reference.

According to one embodiment of the technology, there is provided an image forming system including an information processor; and an image forming apparatus that forms an image on a recording medium. The information processor includes a first image data generating circuitry and a first communicator. The first image data generating circuitry includes a logical page generating circuitry, and generates first image data. The logical page generating circuitry generates a plurality of logical pages each containing one or a plurality of pages that are, in number, equal to or smaller than a predetermined number. The first image data contains the plurality of logical pages. The first communicator transmits the first image data to the image forming apparatus. The image forming apparatus includes a second communicator, a second image data generating circuitry, a cutter, and an image forming unit. The second communicator receives the first image data. The second image data generating circuitry includes a corrector and a page adjusting circuitry, and generates second image data on the basis of the first image data. The corrector corrects a length of each of the logical pages by using the logical pages contained in the first image data as a reference. The page adjusting circuitry adjusts number of pages of the one or the plurality of pages contained in a first logical page of the plurality of logical pages contained in the first image data. The cutter is able to cut the recording medium by using, as a reference, the logical pages contained in the second image data. The image forming unit forms, on the basis of the second image data, an image on the recording medium by using, as a reference, the logical pages contained in the second image data.

DETAILED DESCRIPTION

Figure 1:
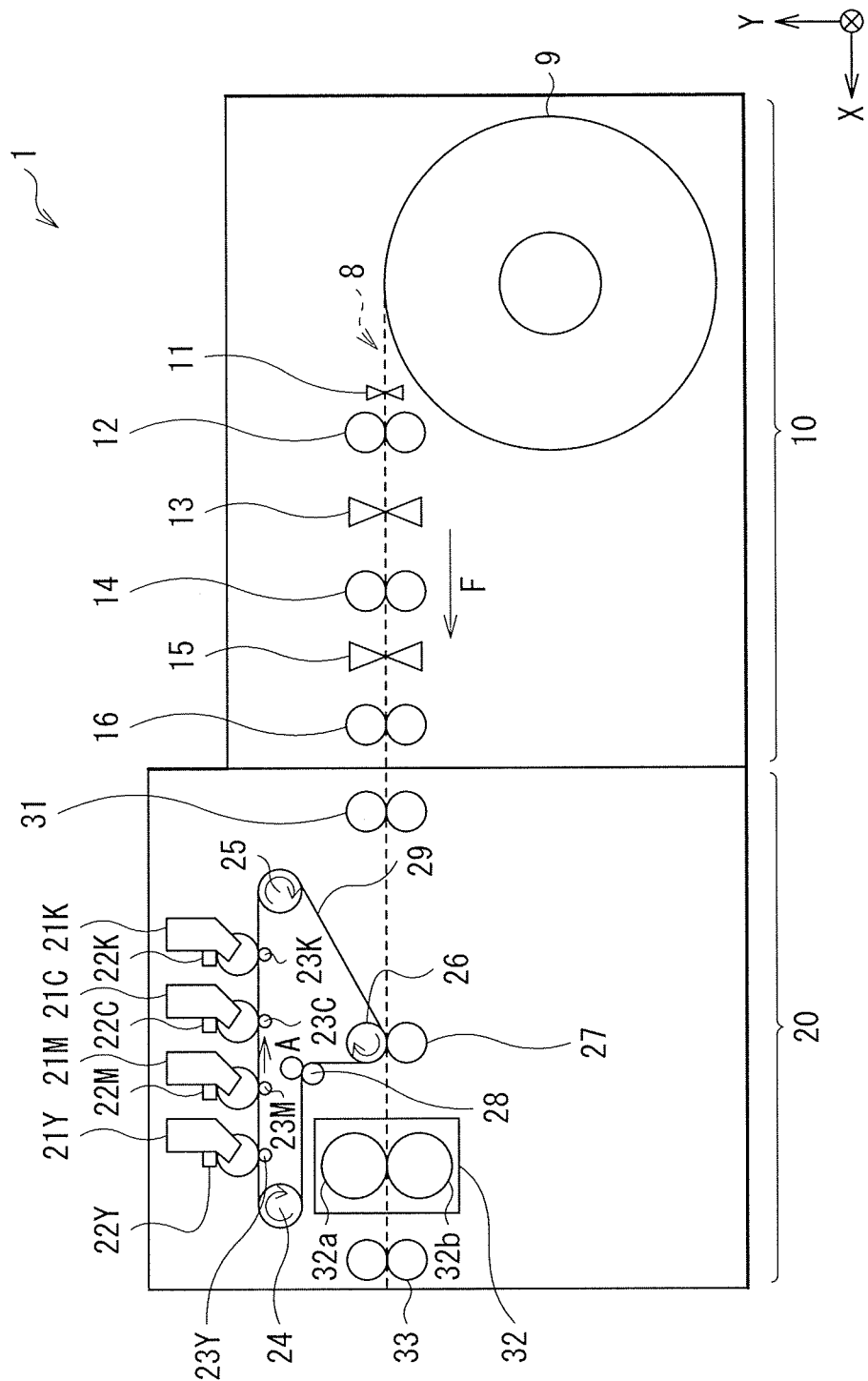
FIG. 1 describes a configuration example of an image forming apparatus according to one example embodiment of the technology.

Some example embodiments of the technology are described below in detail in the following order with reference to the accompanying drawings.
1. First Example Embodiment
2. Second Example Embodiment
3. Third Example Embodiment Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

1. First Example Embodiment

Configuration Example

FIG. 1 illustrates a configuration example of an image forming apparatus (an image forming apparatus 1) that forms an image on the basis of print data DP transmitted from an information processor (a host computer 2) according to a first example embodiment of the technology. The image forming apparatus 1 may be a printer that forms an image, by an electrophotographic scheme, on a recording medium, for example. The recording medium may be so-called roll paper, for example. The image forming apparatus 1 may include a medium feeding unit 10 and an image forming unit 20.

The medium feeding unit 10 may draw out a recording medium 9 from a roll of the recording medium 9, and feed the recording medium 9 to the image forming unit 20. The recording medium 9 may be directed to making labels.

Figure 2:
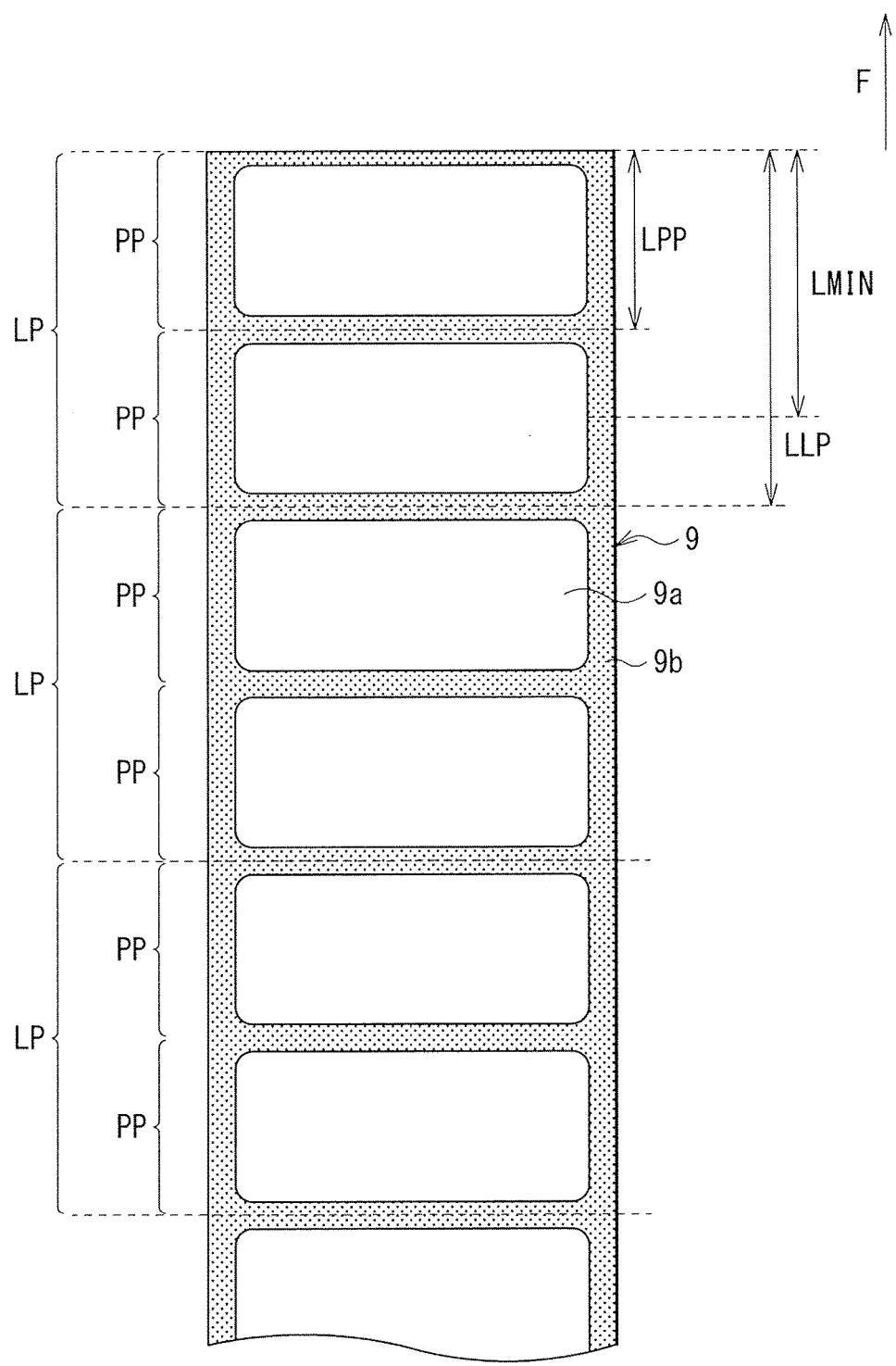
FIG. 2 describes a configuration example of a recording medium illustrated in FIG. 1.

FIG. 2 illustrates a configuration example of the recording medium 9 to be fed to the image forming unit 20. The recording medium 9 may include a plurality of labels 9a and a mount 9b. Each of the labels 9a may be allowed to be peeled off from the mount 9b and attached to various objects. The labels 9a may be disposed side by side in a longitudinal direction of the recording medium 9.

The image forming apparatus 1 may form an image on each of the labels 9a. Each of the labels 9a may correspond to a page PP. Further, the image forming apparatus 1 may perform an image forming operation by using a logical page LP as a reference. The logical page LP may contain a plurality of pages PP. More specifically, the image forming apparatus 1 may perform the image forming operation while correcting a writing start position, on the recording medium 9, at which writing for each of the logical pages LP is to be started. The correction of the writing start position of each of the logical pages LP may be performed on the basis of a result of detection performed by a medium sensor 13 which will be described later in greater detail. Further, the image forming apparatus 1 may be able to cut the recording medium 9 by using the logical page LP as a reference. The logical page LP has a length (a logical page length LLP), in a conveyance direction F, that is so set as to be greater than a minimum value (a minimum medium length LMIN) of the length of the recording medium 9 that is conveyable by the image forming apparatus 1.

Referring to FIG. 1, the medium feeding unit 10 may include a medium sensor 11, a medium feeding roller 12, a medium sensor 13, a conveying roller 14, a cutter 15, and a conveying roller 16. The foregoing members may be disposed in this order in the conveyance direction F along a conveyance path 8.

The medium sensor 11 may detect that the recording medium 9 is being fed on the conveyance path 8. The medium feeding roller 12 may include a pair of rollers that are disposed with the conveyance path 8 in between. The medium feeding roller 12 may convey the recording medium 9 along the conveyance path 8. The medium sensor 13 may detect the labels 9a of the recording medium 9.

Figure 3B:
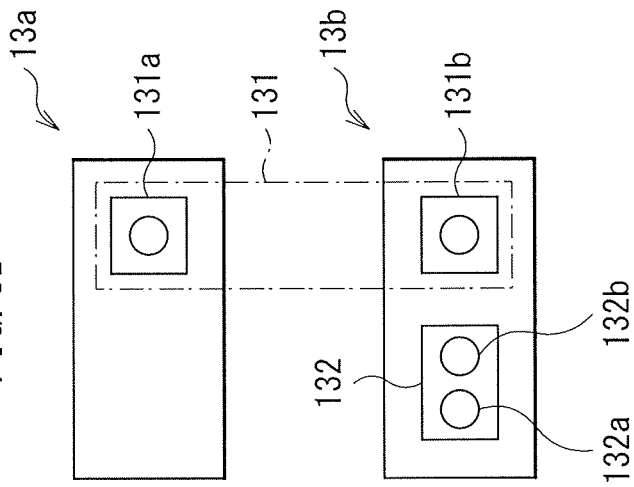
FIGS. 3A and 3B each describe a configuration example of a medium sensor 13 illustrated in FIG. 1.
Figure 3A:
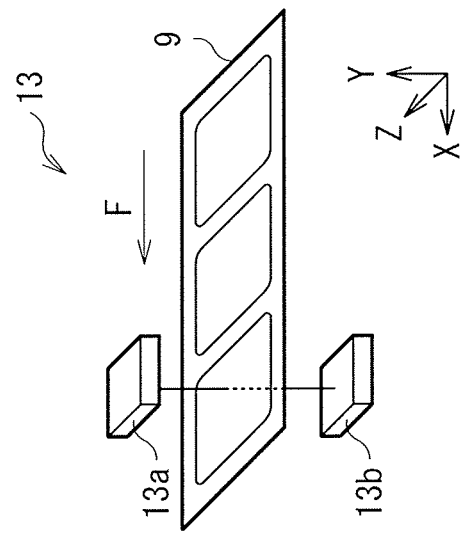

FIGS. 3A and 3B each illustrate a configuration example of the medium sensor 13. The medium sensor 13 may include sensor units 13a and 13b. The sensor unit 13a may face a label surface, of the recording medium 9, onto which the labels 9a are attached. The sensor unit 13b may face the sensor unit 13a with the recording medium 9 in between.

The sensor unit 13a may include a light receiver 131a. The sensor unit 13b may include a light emitter 131b. The light emitter 131b and the light receiver 131a may form a transmission sensor 131. The transmission sensor 131 may allow light outputted from the light emitter 131b to pass through the recording medium 9, and to be received by the light receiver 131a, for example. Upon the light reception, intensity of light received by the light receiver 131a may differ depending on presence or absence of the labels 9a on the recording medium 9. The medium sensor 13 may be thus able to detect the labels 9a.

Further, the sensor unit 13b may include a reflection sensor 132. The reflection sensor 132 may include a light emitter 132b and a light receiver 132a. The reflection sensor 132 may allow light outputted from the light emitter 132b to be reflected by the recording medium 9, and to be received by the light receiver 132a, for example. Upon the light reception, for example, when markers indicating the positions of the labels 9a are printed on a back surface of the mount 9b of the recording medium 9, intensity of light received by the light receiver 132a may differ depending on presence or absence of the markers. The medium sensor 13 may be thus able to detect the labels 9a.

The conveying roller 14 may include a pair of rollers that are disposed with the conveyance path 8 in between. The conveying roller 14 may convey the recording medium 9 along the conveyance path 8. The cutter 15 may cut the recording medium 9. The conveying roller 16 may include a pair of rollers that are disposed with the conveyance path 8 in between. The conveying roller 16 may convey the recording medium 9 along the conveyance path 8 toward the image forming unit 20.

Referring to FIG. 1, the image forming unit 20 may form an image on the recording medium 9 fed from the medium feeding unit 10. The image forming unit 20 may include a conveying roller 31, four developing units 21, four exposure units 22, four primary transfer rollers 23, a transfer belt 29, a drive roller 24, an idle roller 25, a secondary transfer backup roller 26, a secondary transfer roller 27, an oppositely-bending roller 28, a fixing unit 32, and a discharging roller 33. The four developing units 21 may include developing units 21Y, 21M, 21C, and 21K. The four exposure units 22 may include exposure units 22Y, 22M, 22C, and 22K. The four primary transfer rollers 23 may include primary transfer rollers 23Y, 23M, 23C, and 23K.

The conveying roller 31 may include a pair of rollers that are disposed with the conveyance path 8 in between. The conveying roller 31 may convey the recording medium 9 along the conveyance path 8 toward a secondary transfer unit that includes the secondary transfer backup roller 26 and the secondary transfer roller 27.

Each of the four developing units 21 may form a toner image. Specifically, the developing unit 21Y may form a yellow toner image. The developing unit 21M may form a magenta toner image. The developing unit 21C may form a cyan toner image. The developing unit 21K may form a black toner image. Each of the developing units 21 may be attachable and detachable, for example. Each of the developing units 21 may include a photosensitive member. The photosensitive member may be subjected to exposure by the exposure unit 22, and an electrostatic latent image may be thereby formed on the photosensitive member. Thereafter, a developer may be fed to the photosensitive member, and the toner image may be thereby formed on the photosensitive member.

Each of the four exposure units 22 may perform exposure on the photosensitive member in corresponding one of the four developing units 21. Specifically, the exposure unit 22Y may perform exposure on the photosensitive member in the developing unit 21Y. The exposure unit 22M may perform exposure on the photosensitive member in the developing unit 21M. The exposure unit 22C may perform exposure on the photosensitive member in the developing unit 21C. The exposure unit 22K may perform exposure on the photosensitive member in the developing unit 21K.

Each of the four primary transfer rollers 23 may electrostatically transfer the toner image formed by corresponding one of the four developing units 21 onto a transfer surface of the transfer belt 29. The transfer surface of the transfer belt may be a surface, of the transfer belt 29, onto which the toner image is to be transferred. The primary transfer roller 23Y may face the photosensitive member in the developing unit 21Y with the transfer belt 29 in between. The primary transfer roller 23M may face the photosensitive member in the developing unit 21M with the transfer belt 29 in between. The primary transfer roller 23C may face the photosensitive member in the developing unit 21C with the transfer belt 29 in between. The primary transfer roller 23K may face the photosensitive member in the developing unit 21K with the transfer belt 29 in between. Each of the primary transfer rollers 23 may be applied with a predetermined transfer voltage VTR1. The toner image formed by each of the developing units 21 may be thereby transferred onto the transfer surface of the transfer belt 29, i.e., primary transfer may be performed, in the image forming apparatus 1.

The transfer belt 29 may be an endless elastic belt including an electrically-semiconductive plastic film having high resistance, for example. The transfer belt 29 may lie on the drive roller 24, the idle roller 25, the secondary transfer backup roller 26, and the oppositely-bending roller 28, while being stretched. Further, the transfer belt 29 may rotate circularly in accordance with rotation of the drive roller 24.

The drive roller 24 may cause the transfer belt 29 to rotate circularly. In this example, the drive roller 24 may be disposed upstream of the four developing units 21 in a conveyance direction A in which the transfer belt 29 is to be conveyed. The drive roller 24 may rotate clockwise in this example by driving force transmitted from an unillustrated transfer belt motor. The drive roller 24 may thus cause the transfer belt 29 to rotate circularly.

The idle roller 25 may be rotated, clockwise in this example, in accordance with the circular rotation of the transfer belt 29. The idle roller 25 may be disposed downstream of the four developing units 21 in the conveyance direction A of the transfer belt 29 in this example.

The secondary transfer backup roller 26 may be rotated, clockwise in this example, in accordance with the circular rotation of the transfer belt 29. The secondary transfer backup roller 26 may face the secondary transfer roller 27 with the conveyance path 8 and the transfer belt 29 in between.

The secondary transfer roller 27 may transfer the toner image on the transfer surface of the transfer belt 29, onto the labels 9a of the recording medium 9. The secondary transfer roller 27 may face the secondary transfer backup roller 26 with the conveyance path 8 and the transfer belt 29 in between. The secondary transfer roller 27 may be applied with a predetermined transfer voltage VTR2. The toner image on the transfer surface of the transfer belt 29 may be thereby transferred onto the labels 9a of the recording medium 9, i.e., secondary transfer may be performed.

The oppositely-bending roller 28 may include a pair of rollers that are disposed with the transfer belt 29 in between. The oppositely-bending roller 28 may be rotated in accordance with the circular rotation of the transfer belt 29.

The fixing unit 32 may fix, to the recording medium 9, the toner image transferred onto the recording medium 9, by applying heat and pressure to the recording medium 9. The fixing unit 32 may include a heat roller 32a and a pressure-applying roller 32b. The heat roller 32a may include a heater such as a halogen lamp inside the heat roller 32a, for example. The heat roller 32a may apply heat to the toner on the recording medium 9. The pressure-applying roller 32b may be so disposed that a pressure contact between the pressure-applying roller 32b and the heat roller 32a is formed. The pressure-applying roller 32b may apply pressure to the toner on the recording medium 9. This allows the toner on the recording medium 9 to be heated, melted, and applied with pressure, in the fixing unit 32. As a result, the toner image is fixed onto the recording medium 9.

The discharging roller 33 may include a pair of rollers that are disposed with the conveyance path 8 in between. The discharging roller 33 may discharge the recording medium 9 to outside of the image forming apparatus 1.

Figure 4:
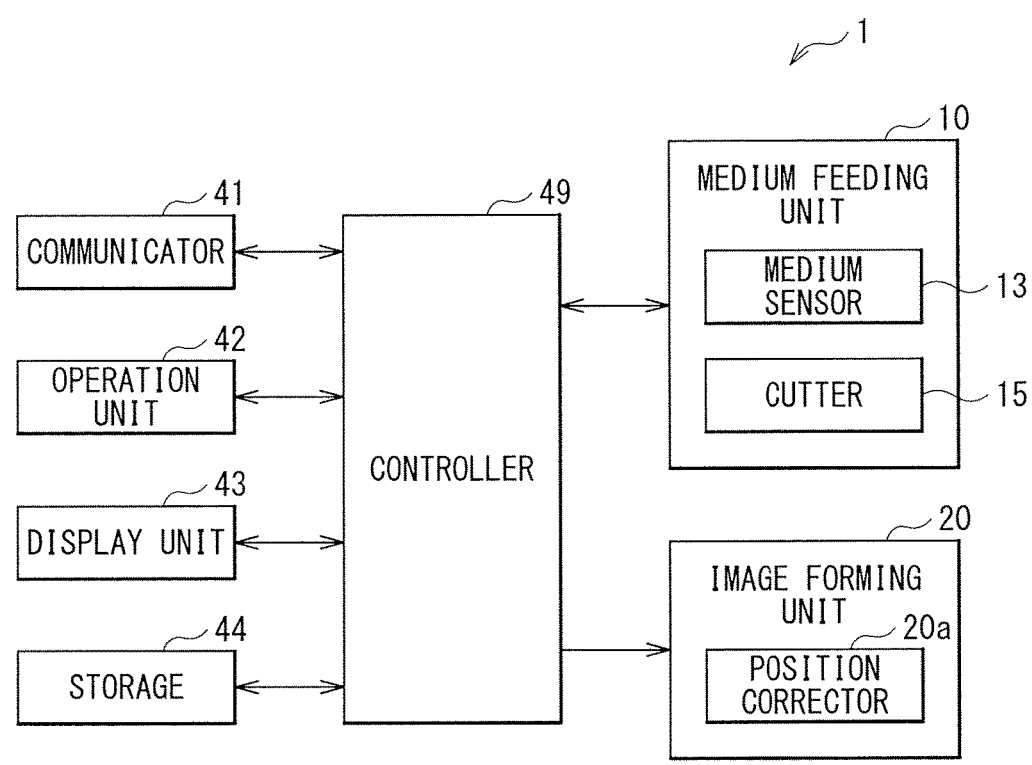
FIG. 4 is a block diagram illustrating a configuration example of a control mechanism in the image forming apparatus illustrated in FIG. 1.

FIG. 4 illustrates an example of a control mechanism in the image forming apparatus 1. The image forming apparatus 1 may include a communicator 41, an operation unit 42, a display unit 43, storage 44, and a controller 49.

The communicator 41 may perform communication by means of universal serial bus (USB) or a local area network (LAN), for example. The communicator 41 may receive, for example, the print data DP transmitted from the host computer 2 which will be described later in greater detail. The operation unit 42 may receive an operation performed by a user. The operation unit 42 may include components such as various buttons, for example. The display unit 43 may display content such as an operation state of the image forming apparatus 1, for example. The display unit 43 may include components such as a liquid crystal display and various indicators, for example. The storage 44 may store information such as the print data DP and pieces of information on various settings of the image forming apparatus 1, for example.

The image forming unit 20 may include a position corrector 20a. The position corrector 20a may correct a writing start position, on the recording medium 9, of each of the logical pages LP on the basis of a result of the detection performed by the medium sensor 13, when the image forming unit 20 performs the image forming operation by using the logical pages LP as a reference. The writing start position of each of the logical pages LP may refer to a position at which writing for each of the logical pages LP is to be started. Specifically, the position corrector 20a may correct the writing start position of each of the logical pages LP, for example, by adjusting rotation speed of each of the various rollers, by increasing or decreasing a margin at an rear end of an image of each of the logical pages LP, or by any other way.

The controller 49 may control an overall operation of the image forming apparatus 1 by controlling respective operations of the communicator 41, the operation unit 42, the display unit 43, the storage 44, the medium feeding unit 10, and the image forming unit 20. Functions of the controller 49 may be achieved by means of hardware, or may be achieved by software, for example.

A description is given below of the host computer 2 that supplies the print data DP to the image forming apparatus 1 described above.

Figure 5:
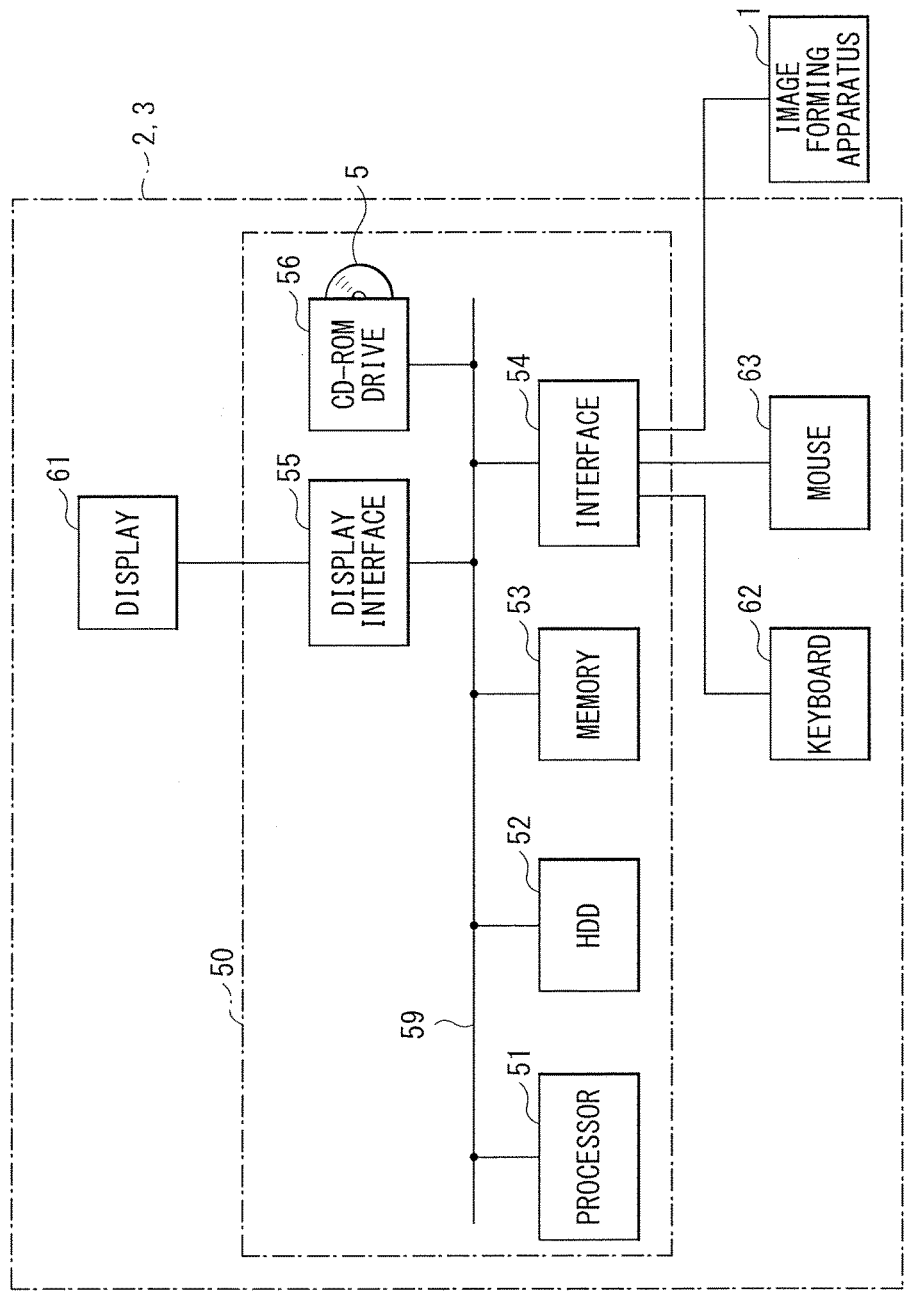
FIG. 5 is a block diagram illustrating a configuration example of a host computer according to one example embodiment of the technology.

FIG. 5 illustrates a configuration example of the host computer 2. In this example, the host computer 2 may be a so-called personal computer, and include a computer main unit 50, a display 61, a keyboard 62, and a mouse 63.

The computer main unit 50 may include a processor 51, a hard disk drive (HDD) 52, a memory 53, an interface 54, a display interface 55, a compact disc read-only memory (CD-ROM) drive 56. The processor 51 may include a central processing unit (CPU), for example. The processor 51 may execute various programs including an operating system 101 and application software 102, which will be described later in greater detail. The HDD 52 may store the various programs. The memory 53 may temporarily store information when the processor 51 performs a process. The interface 54 may be directed to coupling of an external device to the computer main unit 50. The computer main unit 50 may be coupled to the keyboard 62, the mouse 63, and the image forming apparatus 1, via the interface 54, in this example. The display interface 55 may be directed to coupling of the display 61 to the computer main unit 50. The display interface 55 may supply an image signal to the display 61. The CD-ROM drive 56 may read data recorded in a CD-ROM 5. The processor 51, the HDD 52, the memory 53, the interface 54, the display interface 55, and the CD-ROM drive 56 may be coupled to each other via a bus 59.

The display 61 may display an image on the basis of an image signal supplied from the computer main unit 50. The keyboard 62 and the mouse 63 may be used by the user when the user performs input of information.

Figure 6:
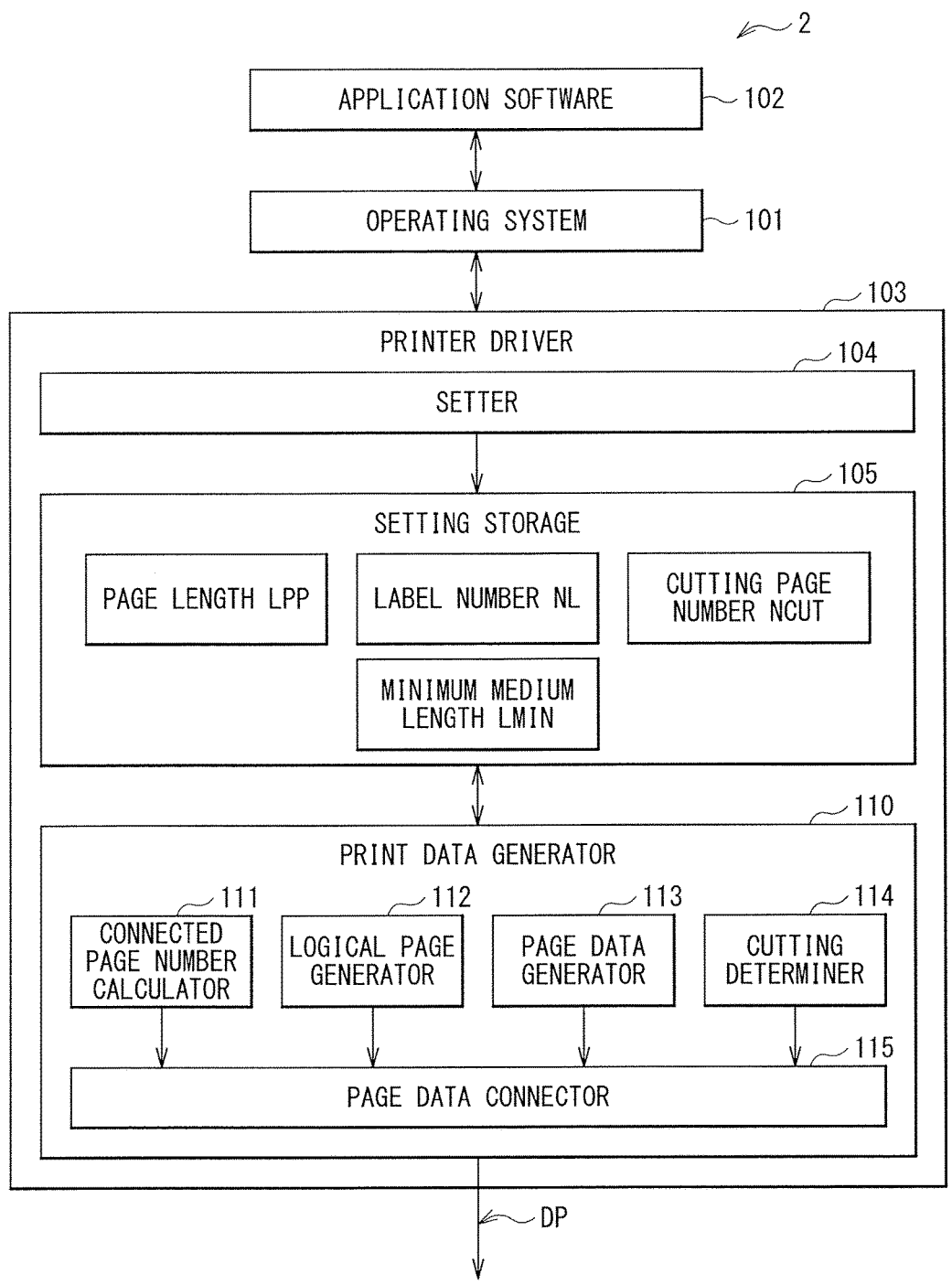
FIG. 6 is a block diagram illustrating an example of a software configuration of a host computer according to a first example embodiment of the technology.

FIG. 6 illustrates an example of a software configuration of the host computer 2. The operating system 101, the application software 102, and a printer driver 103 may be installed on the host computer 2 in this example.

The operating system 101 may be so-called basic software, and control an operation of the host computer 2.

Non-limiting examples of the application software 102 may include image editing software, desk top publishing (DTP) software, and word processor software. The application software 102 may be used by the user when the user performs designing of the labels 9a. Further, the application software 102 may supply the data of the design of the labels 9a to the printer driver 103 via the operating system 101, in response to a printing instruction given by the user.

The printer driver 103 may be a so-called device driver, and control an operation of the image forming apparatus 1. The printer driver 103 may be recorded in the CD-ROM 5, for example, and be installed on the host computer 2 by an operation performed by the user. The printer driver 103 may include a setter 104, setting storage 105, and a print data generator 110.

The setter 104 may perform various print settings by displaying a graphical-user-interface-based (GUI-based) print setting screen on the display 61 of the host computer 2, and receiving an instruction given by the user via the keyboard 62 and the mouse 63.

Figure 7:
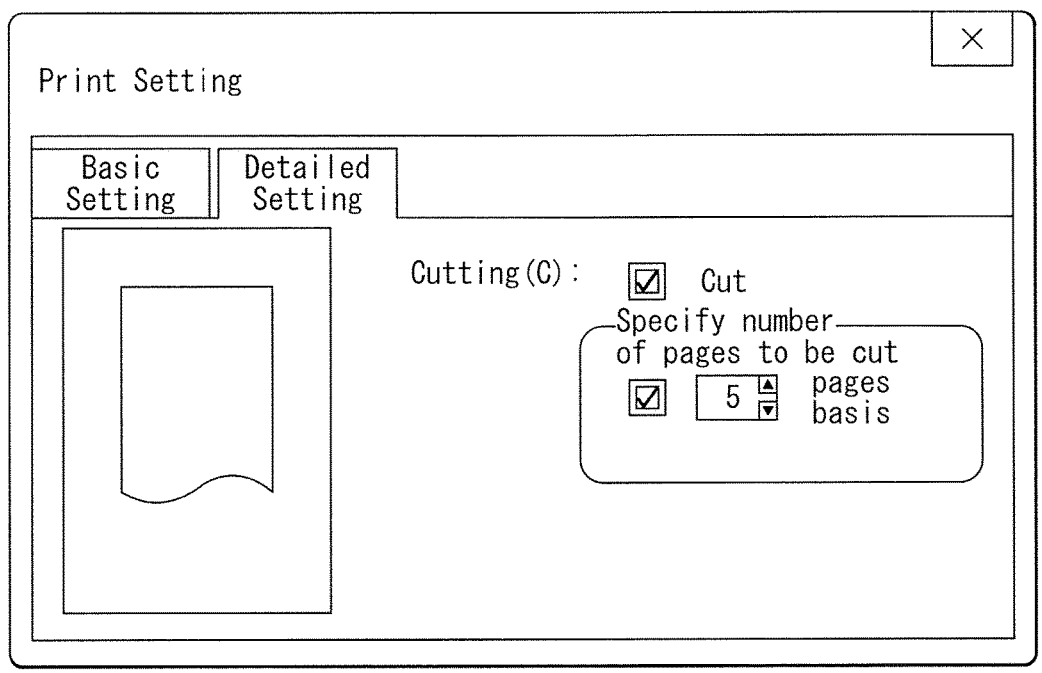
FIG. 7 describes an example of a print setting screen.

FIG. 7 illustrates an example of the print setting screen. The print setting screen may allow for a basic setting and a detailed setting. As the basic setting, the user may set factors such as a length (a page length LPP) of the page PP in the conveyance direction F and number (label number NL) of labels to be printed. It is to be noted that the factors set by the user are not limited to those described above. Further, the user may set factors such as spacing between the labels 9a. Moreover, as the detailed setting, the user may set whether to cut the recording medium 9 as illustrated in FIG. 7, for example. Further, when the recording medium 9 is to be cut, the user may set cutting page number NCUT that indicates the number of pages PP per which the recording medium 9 is to be cut. The cutting page number NCUT may be set to "5" in the example illustrated in FIG. 7.

The setting storage 105 may store the page length LPP, the label number NL, the cutting page number NCUT that are set by the setter 104. Further, the setting storage 105 may also store the minimum medium length LMIN of the image forming apparatus 1.

The print data generator 110 may generate the print data DP on the basis of the data supplied from the application software 102 and the information stored in the setting storage 105. The print data DP may be described by a page description language (PDL), for example. The print data generator 110 may include a connected page number calculator 111, a logical page generator 112, a page data generator 113, a cutting determiner 114, and a page data connector 115.

The connected page number calculator 111 may calculate number (connected page number NPP) of the pages PP that is to be contained in the logical page LP, on the basis of the page length LPP and the minimum medium length LMIN that are stored in the setting storage 105. Specifically, the connected page number calculator 111 may calculate the connected page number NPP by dividing the minimum medium length LMIN by the page length LPP (LMIN/LPP), and rounding up a result of the division to the nearest integer. For example, the connected page number NPP is "2" in the example illustrated in FIG. 2. In other words, the logical page length LLP is twice as long as the page length LPP in this example. This allows the image forming apparatus 1 to cause the logical page length LLP to be longer than the minimum medium length LMIN, and thereby allows the image forming apparatus 1 to cause the length of the recording medium 9 after the cutting to be longer than the minimum medium length LMIN.

The logical page generator 112 may generate the logical page LP.

The page data generator 113 may generate page data that is image data of the single page PP, on the basis of the data supplied from the application software 102.

The cutting determiner 114 may determine whether to cut the recording medium 9, on the basis of the cutting page number NCUT stored in the setting storage 105.

The page data connector 115 may connect the page data generated by the page data generator 113 to the page data contained in the logical page LP. Further, the page data connector 115 may also have a function of adjusting the number of pages PP contained in the logical page LP by connecting a plurality of logical pages LP to each other, as will be described later in greater detail.

The foregoing configuration may allow the print data generator 110 to generate the print data DP. Further, the interface 54 of the host computer 2 may transmit the generated print data DP to the image forming apparatus 1.

In this example, the print data generator 110 may correspond to a "image data generating circuitry" in one specific but non-limiting embodiment of the technology. One of the plurality of logical pages LP may correspond to a "first logical page" in one specific but non-limiting embodiment of the technology. The page data connector 115 may correspond to a "page adjusting circuitry" in one specific but non-limiting embodiment of the technology. The print data DP may correspond to "image data" in one specific but non-limiting embodiment of the technology. The interface 54 may correspond to a "communicator" in one specific but non-limiting embodiment of the technology.

Example Operations and Example Workings

A description is given below of example operations and example workings of the host computer 2 and the image forming apparatus 1 according to the first example embodiment.

[Outline of Overall Operation]

A description is first given of an outline of an overall operation of the host computer 2 and the image forming apparatus 1 with reference to FIGS. 1, 4, and 6. First, the setter 104 of the printer driver 103 of the host computer 2 illustrated in FIG. 6 may perform print setting on the basis of an operation performed by the user. Further, the setting storage 105 may store the page length LPP, the label number NL, and the cutting page number NCUT that are set by the setter 104. The setting storage 105 may also store the minimum medium length LMIN of the image forming apparatus 1. Further, the print data generator 110 may generate the print data DP on the basis of the data supplied from the application software 102 and the information stored in the setting storage 105.

The image forming apparatus 1 illustrated in FIG. 1 may form an image on each of the labels 9a on the basis of the generated print data DP. Specifically, first, the medium feeding roller 12 and the conveying rollers 14, 16, and 31 may convey the recording medium 9 along the conveyance path 8. The medium sensor 13 may detect the labels 9a of the recording medium 9. The cutter 15 may cut the recording medium 9. The developing unit 21Y and the exposure unit 22Y may form the toner image of the yellow toner. The developing unit 21M and the exposure unit 22M may form the toner image of the magenta toner. The developing unit 21C and the exposure unit 22C may form the toner image of the cyan toner. The developing unit 21K and the exposure unit 22K may form the toner image of the black toner. Each of the four primary transfer rollers 23 may electrostatically transfer the toner image formed by corresponding one of the four developing units 21 onto the transfer surface of the transfer belt 29. The position corrector 20a illustrated in FIG. 4 may correct the writing start position, on the recording medium 9, of each of the logical pages LP, on the basis of the result of the detection performed by the medium sensor 13. The secondary transfer roller 27 may transfer the toner images on the transfer surface of the transfer belt 29, onto the labels 9a of the recording medium 9. The fixing unit 32 may fix the toner images on the recording medium 9. The discharging roller 33 may discharge the recording medium 9 to the outside of the image forming apparatus 1.

[Detailed Operation]

The print data generator 110 of the printer driver 103 of the host computer 2 may generate the print data DP on the basis of the data supplied from the application software 102 and the information stored in the setting storage 105. This operation is described below in detail.

Figure 8:
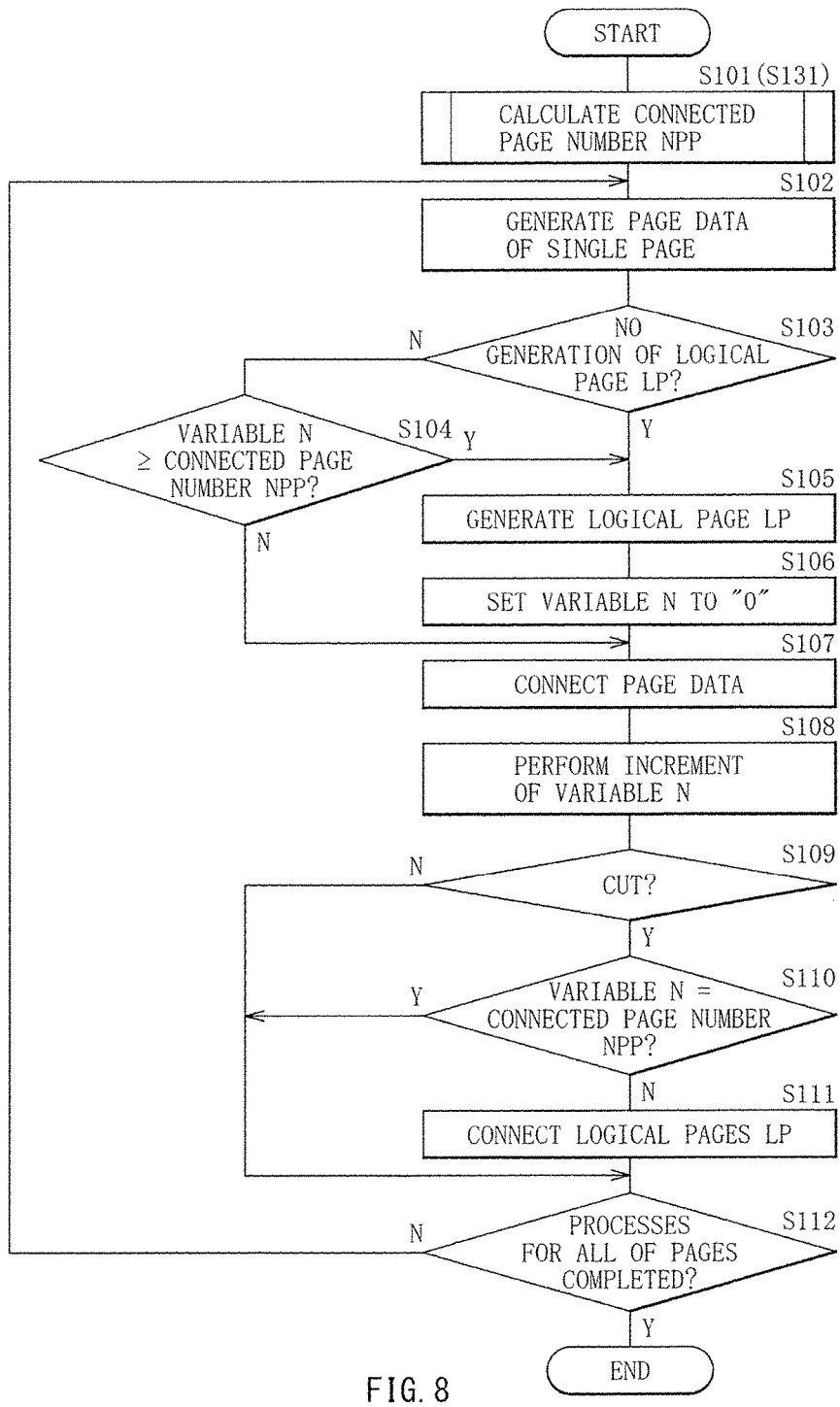
FIG. 8 is a flowchart illustrating an operation example of a printer driver illustrated in FIG. 6.

FIG. 8 illustrates an operation example of the print data generator 110. The print data generator 110 may first calculate the connected page number NPP, and sequentially generate the logical pages LP on the basis of the connected page number NPP. Further, the print data generator 110 may adjust the number of the pages PP contained in the logical page LP that is located immediately before a position at which cutting is to be performed, on the basis of the cutting page number NCUT. This operation is described below in detail.

First, the connected page number calculator 111 of the print data generator 110 may calculate the connected page number NPP in step S101.

Figure 9:
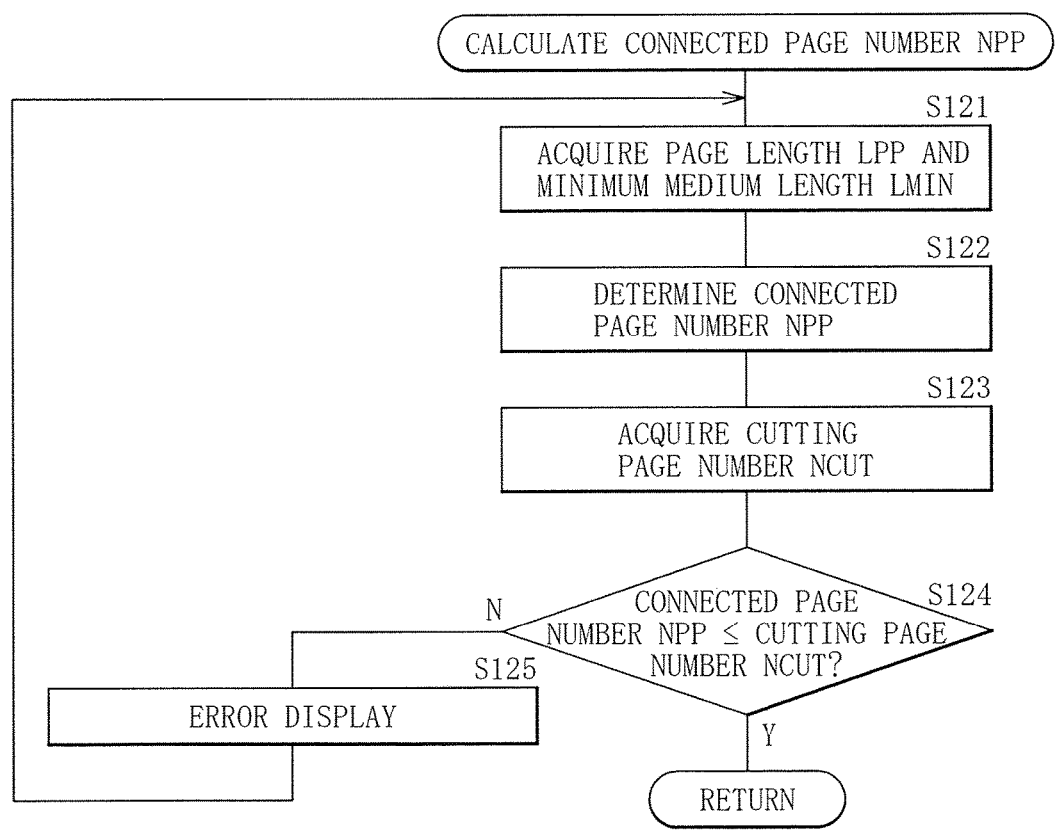
FIG. 9 is another flowchart illustrating an operation example of the printer driver illustrated in FIG. 6.

FIG. 9 illustrates an example of a process of calculating the connected page number NPP. The connected page number calculator 111 may calculate the connected page number NPP on the basis of the page length LPP and the minimum medium length LMIN in the following manner.

First, the connected page number calculator 111 may acquire the page length LPP and the minimum medium length LMIN from the setting storage 105 in step S121. Further, the connected page number calculator 111 may calculate the connected page number NPP on the basis of the page length LPP and the minimum medium length LMIN in step S122. Specifically, the connected page number calculator 111 may divide the minimum medium length LMIN by the page length LPP (LMIN/LPP), and round up a result of the division to the nearest integer, thereby calculating the connected page number NPP.

Thereafter, the connected page number calculator 111 may acquire the cutting page number NCUT from the setting storage 105 in step S123. Further, in step S124, the connected page number calculator 111 may confirm whether the connected page number NPP calculated in step S122 is equal to or smaller than the cutting page number NCUT, i.e., whether NPP≤NCUT is established. When the connected page number NPP is greater than the cutting page number NCUT, i.e., when "N" is determined in step S124, the printer driver 103 may cause the display 61 to perform error display in step S125, and the flow may return to step S121. In other words, in this case, as a result of the small cutting page number NCUT, the length of the recording medium 9 after the cutting may be shorter than the minimum medium length LMIN. The printer driver 103 may therefore prompt the user, for example, to re-enter the cutting page number NCUT, by performing the error display.

When the connected page number NPP is smaller than the cutting page number NCUT in step S124, i.e., when "Y" is determined in step S124, the flow of the process of calculating the connected page number NPP is brought to an end.

Thereafter, in step S102, the page data generator 113 may generate the page data for the single page PP on the basis of the data supplied from the application software 102.

Thereafter, in step S103, the page data connector 115 may confirm whether the logical page LP has not been generated yet. When the logical page LP has been already generated, i.e., when "N" is determined in step S103, the page data connector 115 may confirm whether a variable N is equal to or greater than the connected page number NPP, i.e., whether N≥NPP is established, in step S104. When the variable N is smaller than the connected page number NPP, i.e., when "N" is determined in step S104, the flow may proceed to step S107.

When the logical page LP has not yet generated in step S103, i.e., when "Y" is determined in step S103, or when the variable N is equal to or greater than the connected page number NPP in step S104, i.e., when "Y" is determined in step S104, the logical page generator 112 may generate the logical page LP in step S105.

Thereafter, the print data generator 110 may set the variable N to "0" (zero) in step S106.

Thereafter, the page data connector 115 may connect the page data generated in step S102 to the page data contained in the current logical page LP, in step S107.

Thereafter, the print data generator 110 may perform increment of the variable N in step S108. Upon the increment, the variable N may be the number of pieces of the page data contained in the current logical page LP.

Thereafter, in step S109, the cutting determiner 114 may determine whether to perform cutting immediately after the current page PP, on the basis of the cutting page number NCUT. When the cutting is not to be performed immediately after the current page PP, i.e., when "N" is determined in step S109, the flow may proceed to step S112.

When the cutting is to be performed immediately after the current page PP, i.e., when "Y" is determined in step S109, the page data connector 115 may confirm whether the variable N is equal to the connected page number NPP, i.e., whether N=NPP is established, in step S110. When the variable N is equal to the connected page number NPP, i.e., when "Y" is determined in step S110, the flow may proceed to step S112.

When the variable N is different from the connected page number NPP, i.e., when "N" is determined in step S110, the page data connector 115 may connect the current logical page LP to the previous logical page LP in step S111. Specifically, the page data connector 115 may combine the current logical page LP and the previous logical page LP into a single logical page LP by connecting the page data of the current logical page LP to the page data of the previous logical page LP. Further, the page data connector 115 may change the variable N to the number of pieces of the page data contained in the single logical page LP resulting from the combining.

Thereafter, in step S112, the print data generator 110 may confirm whether processes for all of the pages PP have been completed, on the basis of the label number NL stored in the setting storage 105. When the processes for all of the pages PP have not been completed yet, i.e., when "N" is determined in step S112, the flow may return to step S102, and the processes in steps S102 to S112 may be performed repeatedly until the processes for all of the pages PP are completed.

When the processes for all of the pages PP have been completed already in step S112, i.e., when "Y" is determined in step S112, the flow may be brought to an end.

Next, the operations of the printer driver 103 and the image forming apparatus 1 are described referring to specific but non-limiting examples.

Figure 10:
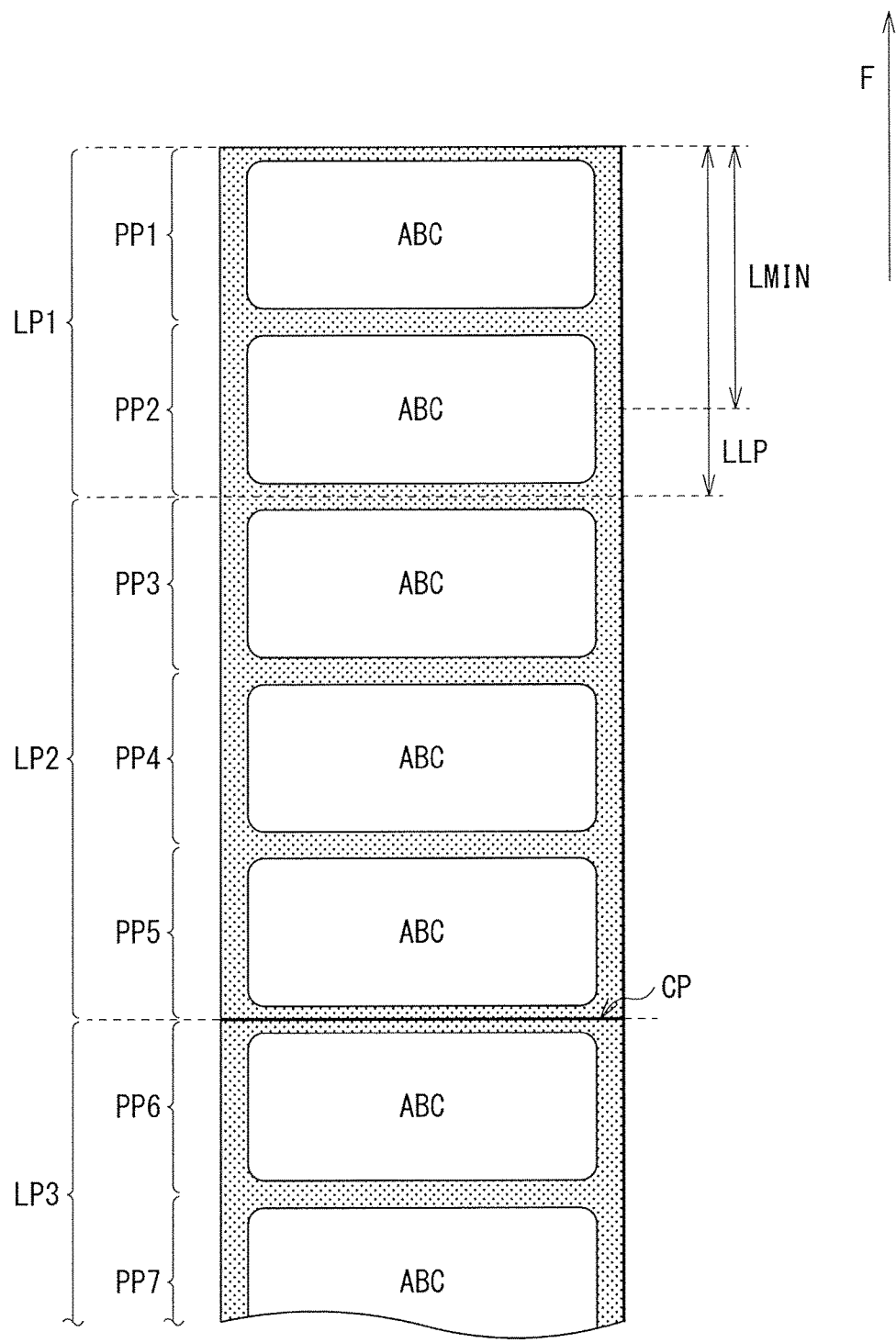
FIG. 10 describes an operation example of the printer driver illustrated in FIG. 6.

FIG. 10 illustrates an example of the recording medium 9 on which an image is formed on the basis of the print data DP generated by the printer driver 103. In this example, the cutting page number NCUT is set to "5", and the label number NL is set to "10". Further, the image forming apparatus 1 prints "ABC" on each of the labels 9a. In this example case, the print data generator 110 generates a logical page LP1 containing two pages, i.e., pages PP1 and PP2, generates a logical page LP2 containing three pages, i.e., pages PP3 to PP5, and sets a cutting position CP immediately after the page PP5. The cutting position CP may be a position at which cutting is to be performed. Further, the print data generator 110 generates a logical page LP3 containing two pages, i.e., pages PP6 and PP7, generates a logical page LP4 containing three pages, i.e., pages PP8 to PP10, and sets the cutting position CP immediately after the page PP10. Further, the image forming apparatus 1 forms the image on the recording medium 9 on the basis of the print data DP thus generated, and cuts the recording medium 9. This operation is described below in detail.

First, a description is given of an operation of the print data generator 110 of the printer driver 103.

In step S101, the connected page number calculator 111 calculates the connected page number NPP by dividing the minimum medium length LMIN by the page length LPP (LMIN/LPP) and rounding up the result of the division to the nearest integer. The connected page number NPP is "2" in this example.

Thereafter, the page data generator 113 generates the page data of the initial page PP1 in step S102. The logical page LP has not been generated yet, i.e., "Y" is determined in step S103. The logical page generator 112 therefore generates the initial logical page LP1 in step S105. Further, the print data generator 110 sets the variable N to "0" (zero) in step S106. Thereafter, the print data generator 110 performs increment of the variable N and thereby sets the variable N to "1", in step S108. Specifically, the variable N is "1" on the ground that the current logical page LP1 contains a single piece of page data. On the ground that the cutting page number NCUT is "5", cutting is not performed immediately after the page PP1, i.e., "N" is determined in step S109. Further, on the ground that the label number NL is "10", the processes for all of the pages PP have not been completed yet, i.e., "N" is determined in step S112. The flow therefore proceeds to a process for a subsequent page PP.

Thereafter, the page data generator 113 generates page data of the second page PP2 in step S102. The logical page LP1 has been generated already, i.e., "N" is determined in step S103, and the value "1" of the variable N is smaller than the value "2" of the connected page number NPP, i.e., "N" is determined in step S104. The page data connector 115 therefore connects the page data of the page PP2 to the page data contained in the logical page LP1 in step S107. Further, the print data generator 110 performs increment of the variable N, and thereby sets the variable N to "2" in step S108. Specifically, the variable N is "2" on the ground that the current logical page LP1 contains two pieces of page data. The cutting is not performed immediately after the page PP2, i.e., "N" is determined in step S109. The processes for all of the pages PP have not been completed yet, i.e., "N" is determined in step S112. The flow therefore proceeds to a process for a subsequent page PP.

Thereafter, the page data generator 113 generates page data of the third page PP3 in step S102. The logical page LP1 has been generated already, i.e., "N" is determined in step S103, and the value "2" of the variable N is equal to the value "2" of the connected page number NPP, i.e., "Y" is determined in step S104. The logical page generator 112 therefore generates the second logical page LP2 in step S105. Further, the print data generator 110 sets the variable N to "0" (zero) in step S106. Thereafter, the print data generator 110 performs increment of the variable N and thereby sets the variable N to "1", in step S108. Specifically, the variable N is "1" on the ground that the current logical page LP2 contains a single piece of page data. Cutting is not performed immediately after the page PP3, i.e., "N" is determined in step S109. The processes for all of the pages PP have not been completed yet, i.e., "N" is determined in step S112. The flow therefore proceeds to a process for a subsequent page PP.

Thereafter, the page data generator 113 generates page data of the fourth page PP4 in step S102. The logical page LP2 has been generated already, i.e., "N" is determined in step S103, and the value "1" of the variable N is smaller than the value "2" of the connected page number NPP, i.e., "N" is determined in step S104. The page data connector 115 therefore connects the page data of the page PP4 to the page data contained in the logical page LP2 in step S107. Further, the print data generator 110 performs increment of the variable N, and thereby sets the variable N to "2", in step S108. Specifically, the variable N is "2" on the ground that the current logical page LP2 contains two pieces of page data. The cutting is not performed immediately after the page PP4, i.e., "N" is determined in step S109. The processes for all of the pages PP have not been completed yet, i.e., "N" is determined in step S112. The flow therefore proceeds to a process for a subsequent page PP.

Thereafter, the page data generator 113 generates page data of the fifth page PP5 in step S102. The logical page LP2 has been generated already, i.e., "N" is determined in step S103, and the value "2" of the variable N is equal to the value "2" of the connected page number NPP, i.e., "Y" is determined in step S104. The logical page generator 112 therefore tentatively generates the third logical page LP3 in step S105. Further, the print data generator 110 sets the variable N to "0" (zero) in step S106. Thereafter, the print data generator 110 performs increment of the variable N and thereby sets the variable N to "1", in step S108. The cutting determiner 114 determines that the cutting is to be performed immediately after the page PP5, i.e., "Y" is determined in step S109, on the ground that the cutting page number NCUT is "5". Further, the value "1" of the variable N is different from the value "2" of the connected page number NPP, i.e., "N" is determined in step S110. The page data connector 115 therefore combines the current logical page LP3 and the previous logical page LP2 into the single logical page LP2 by connecting the page data of the current logical page LP3 to the page data of the previous logical page LP2, in step S111. Further, the page data connector 115 changes the variable N to the number of pieces of the page data contained in the logical page LP2 resulting from the combining, i.e., "3". In this example, the logical page LP2 may correspond to the "first logical page" in one specific but non-limiting embodiment of the technology. The processes for all of the pages PP have not been completed yet, i.e., "N" is determined in step S112. The flow therefore proceeds to a process for a subsequent page PP.

Thereafter, the page data generator 113 generates page data of the sixth page PP6 in step S102. The logical page LP2 has been generated already, i.e., "N" is determined in step S103, and the value "3" of the variable N is greater than the value "2" of the connected page number NPP, i.e., "Y" is determined in step S104. The logical page generator 112 therefore generates the third logical page LP3 in step S105. Further, the print data generator 110 sets the variable N to "0" (zero) in step S106. Thereafter, the print data generator 110 performs increment of the variable N and thereby sets the variable N to "1", in step S108. The cutting is not performed immediately after the page PP6, i.e., "N" is determined in step S109. The processes for all of the pages PP have not been completed yet, i.e., "N" is determined in step S112. The flow therefore proceeds to a process for a subsequent page PP.

Thereafter, the print data generator 110 performs processes similar to the foregoing processes. Specifically, the print data generator 110 generates the logical page LP3 containing the two pages PP6 and PP7, and generates the logical page LP4 containing the three pages PP8 to PP10. Further, the process for the page PP10 is completed. Accordingly, the processes for all of the pages PP are completed, i.e., "Y" is determined in step S112. The flow is thereby brought to an end. The printer driver 103 may generate the print data DP as described above. Further, the host computer 2 may transmit the print data DP thus generated to the image forming apparatus 1.

Next, a description is given of a specific but non-limiting example of the operation of the image forming apparatus 1. The image forming apparatus 1 forms an image on the recording medium 9 and cuts the recording medium 9, on the basis of the print data DP transmitted from the host computer 2.

First, the medium feeding roller 12 and the conveying rollers 14, 16, and 31 convey the recording medium 9 along the conveyance path 8. The medium sensor 13 detects the labels 9a of the recording medium 9. The position corrector 20a of the image forming unit 20 first corrects the writing start position, on the recording medium 9, of the logical page LP1, on the basis of the result of the detection performed by the medium sensor 13. Further, the image forming unit 20 forms images on the respective two labels 9a of the recording medium 9, on the basis of the data of the logical page LP1. Thereafter, the position corrector 20a of the image forming unit 20 corrects the writing start position, on the recording medium 9, of the logical page LP2, on the basis of the result of the detection performed by the medium sensor 13. Further, the image forming unit 20 forms images on the respective three labels 9a of the recording medium 9, on the basis of the data of the logical page LP2. Further, the cutter 15 cuts the recording medium 9 at the cutting position CP that is located immediately after the page PP5.

Thereafter, the position corrector 20a of the image forming unit 20 corrects the writing start position, on the recording medium 9, of the logical page LP3, on the basis of the result of the detection performed by the medium sensor 13. Further, the image forming unit 20 forms images on the respective two labels 9a of the recording medium 9, on the basis of the data of the logical page LP3. Thereafter, the position corrector 20a of the image forming unit 20 corrects the writing start position, on the recording medium 9, of the logical page LP4, on the basis of the result of the detection performed by the medium sensor 13. Further, the image forming unit 20 forms images on the respective three labels 9a of the recording medium 9, on the basis of the data of the logical page LP4. Further, the cutter 15 cuts the recording medium 9 at the cutting position CP that is located immediately after the page PP10.

As described above, the printer driver 103 may connect the logical pages LP to each other in step S111. It is therefore possible to adjust the number of the pages PP contained in the logical page LP. As a result, the printer driver 103 is able to cause a position at which the logical page LP ends to be coincident with the cutting position of the recording medium 9. Hence, it is possible to efficiently utilize the recording medium 9.

Comparative Example

Next, a description is given of example workings of the first example embodiment, comparing the first example embodiment with a comparative example. A print data generator 110R of a printer driver 103R according to the comparative example fixes, to a predetermined number, the number of the pages PP contained in the logical page LP.

Figure 11:
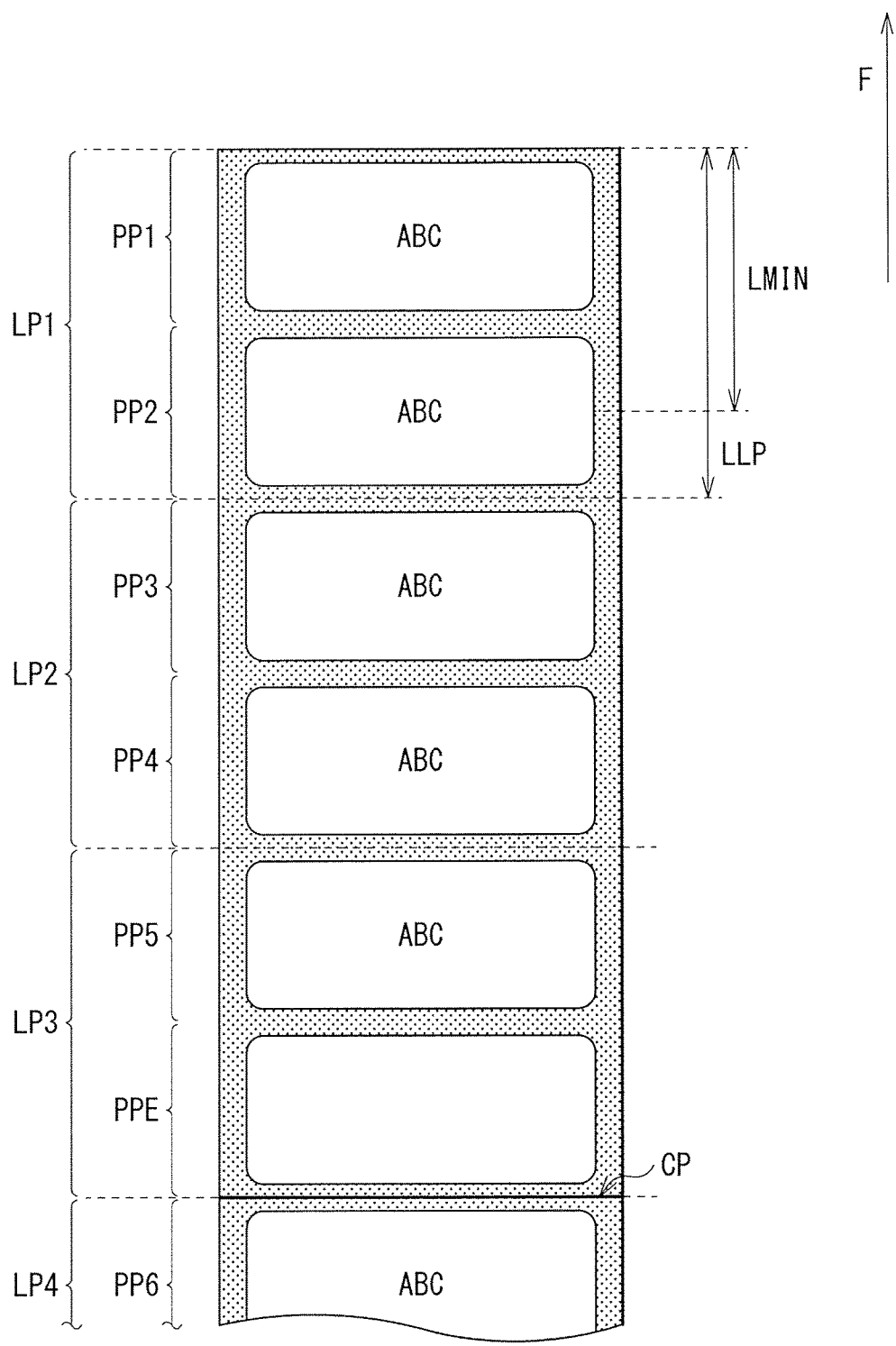
FIG. 11 describes an operation example of a printer driver according to a comparative example.

FIG. 11 illustrates an example of the recording medium 9 on which an image is formed on the basis of print data DP generated by the printer driver 103R according to the comparative example. In this example case, the print data generator 110R generates a logical page LP1 containing two pages, i.e., pages PP1 and PP2, and generates a logical page LP2 containing two pages, i.e., pages PP3 and PP4. Further, the print data generator 110R generates a logical page LP3 containing a single page PP5 and a single blank page PPE. That is, although the cutting page number NCUT is "5", The image forming apparatus 1 performs cutting using the logical page LP as a reference. Therefore, the print data generator 110R inserts the blank page PPE, and sets the cutting position CP immediately after the inserted page PPE, in this example.

The printer driver 103R according to the comparative example fixes, to the predetermined number, the number of the pages PP contained in the logical page LP. It may be therefore unavoidable to insert the blank page PPE in some cases. In such cases, the labels 9a may be wasted.

In order to avoid the insertion of the foregoing blank page PPE, there may be employed a method which so limits the cutting page number NCUT that the cutting page number NCUT is the integral multiple of the connected page number NPP. Upon using this method, for example, when the connected page number NPP is "2", the user is allowed to set the cutting page number NCUT only to an even number. This, however, may lower the degree of freedom in setting the cutting page number NCUT. Further, for example, when it is desired to print five labels 9a, the cutting page number NCUT is set to "6". Consequently, six labels 9a are subjected to printing, resulting in waste of the label 9a.

In contrast, the printer driver 103 according to the first example embodiment is able to adjust the number of the pages PP contained in the logical page LP. This eliminates the necessity of the insertion of the blank page PPE. As a result, it is possible to efficiently utilize the recording medium 9 while maintaining the degree of freedom in setting, in the printer driver 103.

Example Effects

According to the first example embodiment, the number of the pages contained in the logical page is adjustable as described above. Hence, it is possible to efficiently utilize the recording medium while maintaining the degree of freedom in setting.

Modification Example 1-1

The setting storage 105 of the printer driver 103 stores the minimum medium length LMIN of the image forming apparatus 1 in advance in the foregoing first example embodiment; however, this is non-limiting. Alternatively, the minimum medium length LMIN may be acquired from the image forming apparatus 1, for example, by causing the host computer 2 to perform communication with the image forming apparatus 1.

Modification Example 1-2

Figure 13:
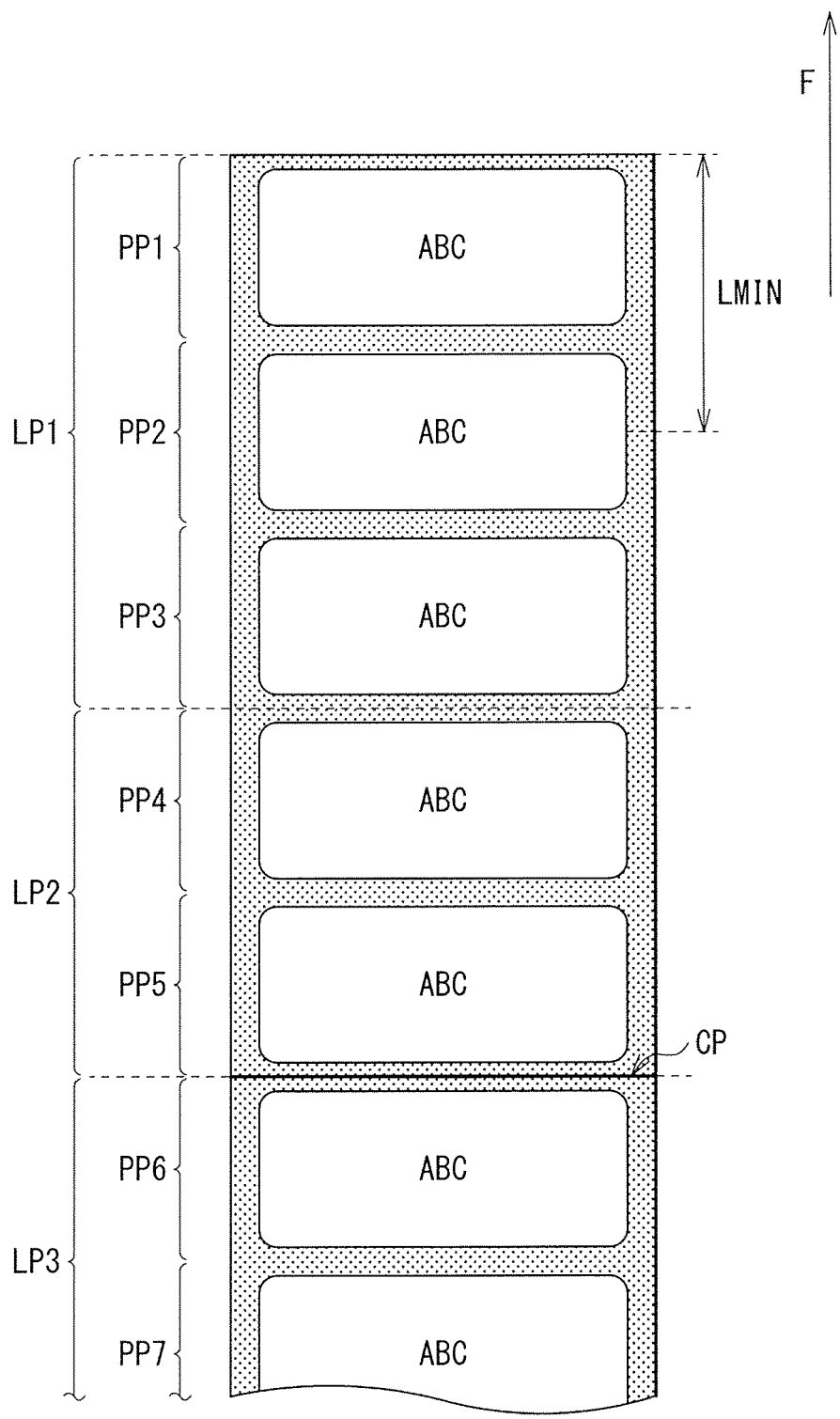
FIG. 13 describes an operation example of a printer driver according to another modification example of the first example embodiment.
Figure 14:
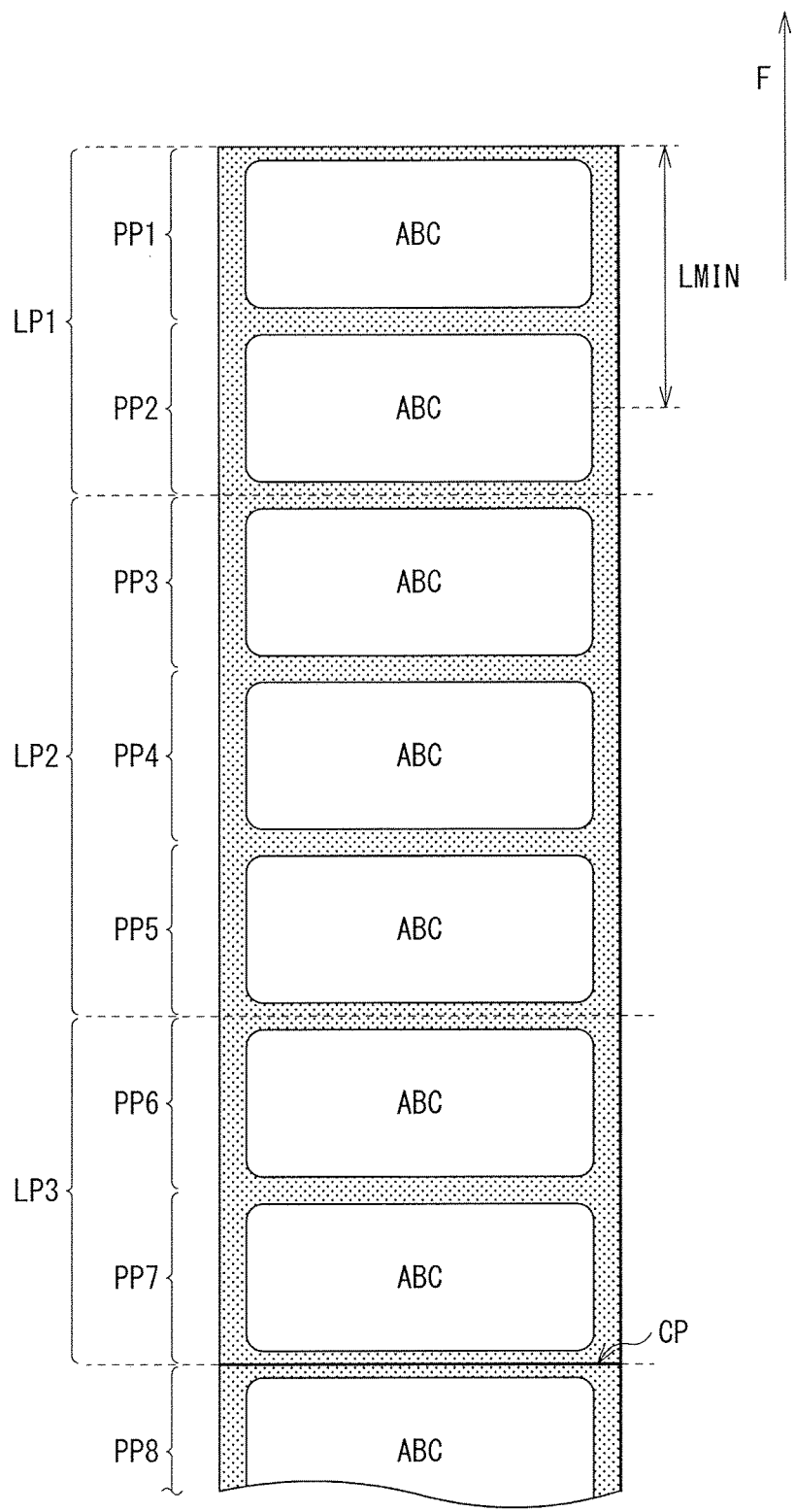
FIG. 14 describes an operation example of a printer driver according to still another modification example of the first example embodiment.

The number of the pages PP contained in the last logical page LP before the cutting position CP may be adjusted as illustrated in FIG. 10 in the foregoing first example embodiment; however, this is non-limiting. Alternatively, referring to FIG. 13, the number of the pages PP contained in the initial logical page LP may be adjusted, for example. In this alternative example, the print data generator 110 may generate a logical page LP1 containing three pages, i.e., pages PP1 to PP3, and generate a logical page LP2 containing two pages, i.e., pages PP4 and PP5. In this example case, the logical page LP1 may correspond to the "first logical page" in one specific but non-limiting embodiment of the technology. Alternatively, referring to FIG. 14, the number of the pages PP contained in any logical page LP other than the initial and the last logical pages LP may be adjusted, when the number of the logical pages LP before the cutting position CP is 3 or greater, for example. In the example illustrated in FIG. 14, the cutting page number NCUT is set to "7". Further, the print data generator 110 generates a logical page LP1 containing two pages, i.e., pages PP1 and PP2, generates a logical page LP2 containing three pages, i.e., pages PP3 to PP5, and generates a logical page LP3 containing two pages, i.e., pages PP6 and PP7. In this example case, the logical page LP2 may correspond to the "first logical page" in one specific but non-limiting embodiment of the technology.

Modification Example 1-3

Figure 12:
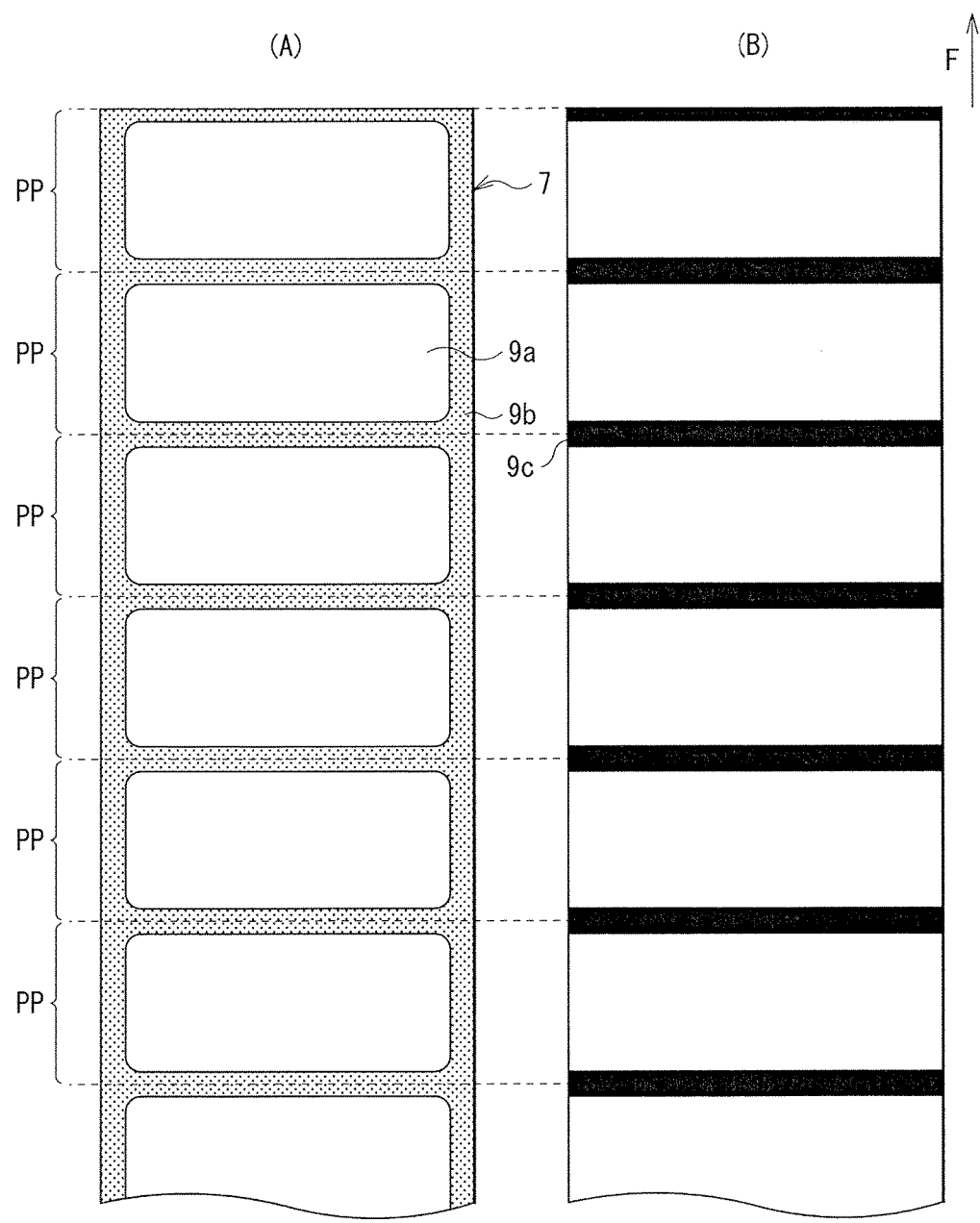
FIG. 12 describes a configuration example of a recording medium according to a modification example of the first example embodiment.

The image forming apparatus 1 may form an image on the recording medium 9 illustrated in FIG. 2 in the foregoing first example embodiment; however, this is non-limiting. Alternatively, referring to FIG. 12, an image may be formed on a recording medium 7 in which markers 9c are printed on a back surface of the mount 9b as illustrated in Part (B) of FIG. 12, for example. The markers 9c may be provided in the conveyance direction F at positions at which no label 9a is present. The markers 9c may each have a width corresponding to spacing between the two labels 9a that are adjacent to each other. It is to be noted that, in the example illustrated in FIG. 12, the markers 9c may be provided across the recording medium 7 as a whole in the width direction; however, this is non-limiting. Alternatively, the markers 9c may be provided at only part of the recording medium 7 in the width direction. The medium sensor 13 may be able to detect the labels 9a on the foregoing recording medium 7 by means of the reflection sensor 132. It is to be also noted that, in the example illustrated in FIG. 12, the markers 9c may be provided at the positions that are on the back surface of the mount 9b and at which no label 9a is present; however, this is non-limiting. Alternatively, the markers 9c may be provided at positions that are on the back surface of the mount 9b and that correspond to the labels 9a.

Modification Example 1-4

The printer driver 103 of the host computer 2 may adjust the number of the pages PP contained in the logical page LP in the foregoing first example embodiment; however, this is non-limiting. Alternatively, the adjustment of the number of the pages PP may be performed by the image forming apparatus, for example. This modification example is described below in detail.

Figure 15:
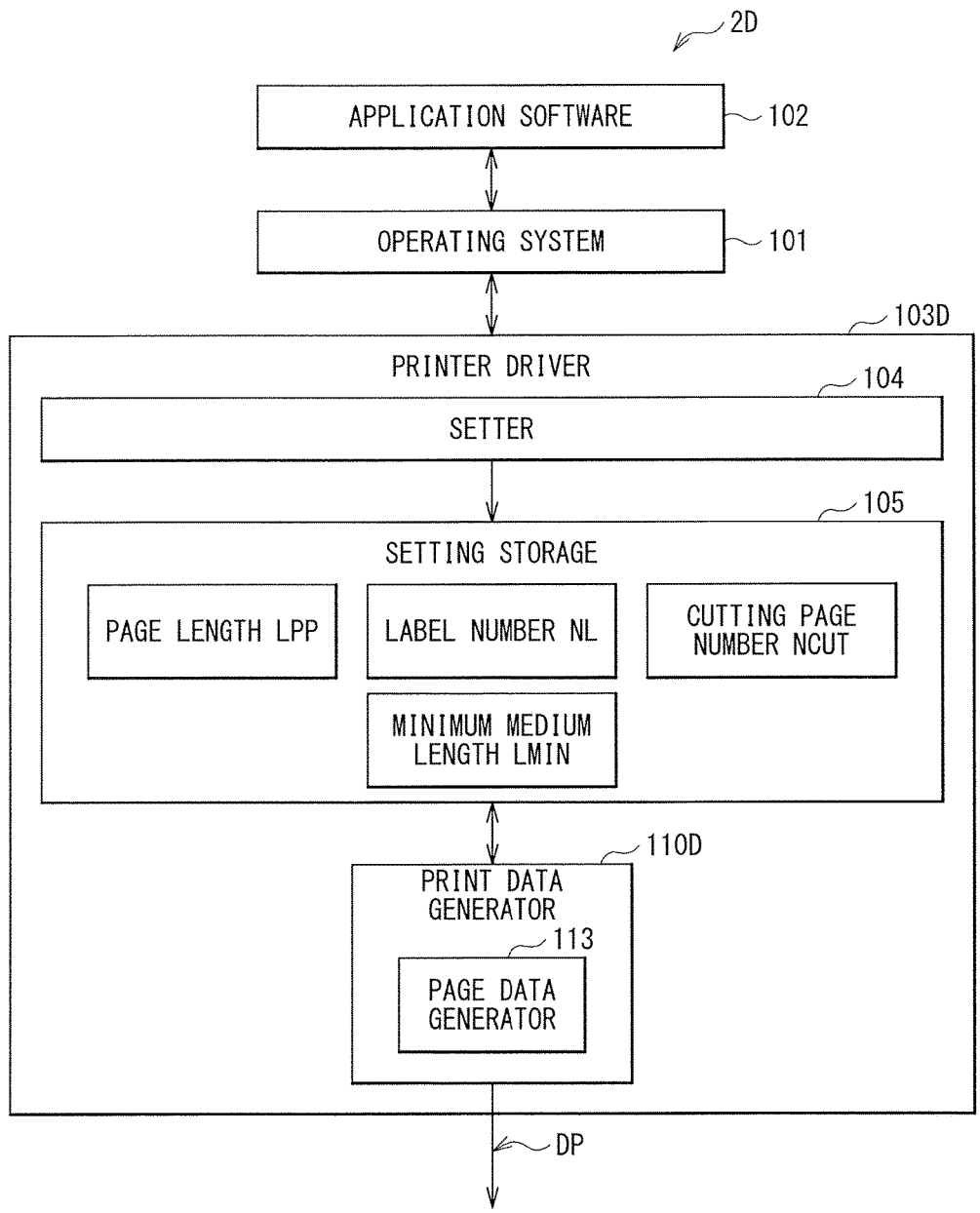
FIG. 15 is a block diagram illustrating an example of a software configuration of a host computer according to the still another modification example of the first example embodiment.

FIG. 15 illustrates an example of a software configuration of a host computer 2D according to the present modification example. A printer driver 103D may be installed on the host computer 2D.

The printer driver 103D may include the setter 104, the setting storage 105, and a print data generator 110D. The print data generator 110D may include the page data generator 113. The print data generator 110D may generate the print data DP on the basis of the page data generated by the page data generator 113 and the information stored in the setting storage 105. Non-limiting examples of the information stored in the setting storage 105 may include the page length LPP, the label number NL, the cutting page number NCUT, and the minimum medium length LMIN. Further, the host computer 2D may transmit the generated print data DP to an image forming apparatus 1D.

Figure 16:
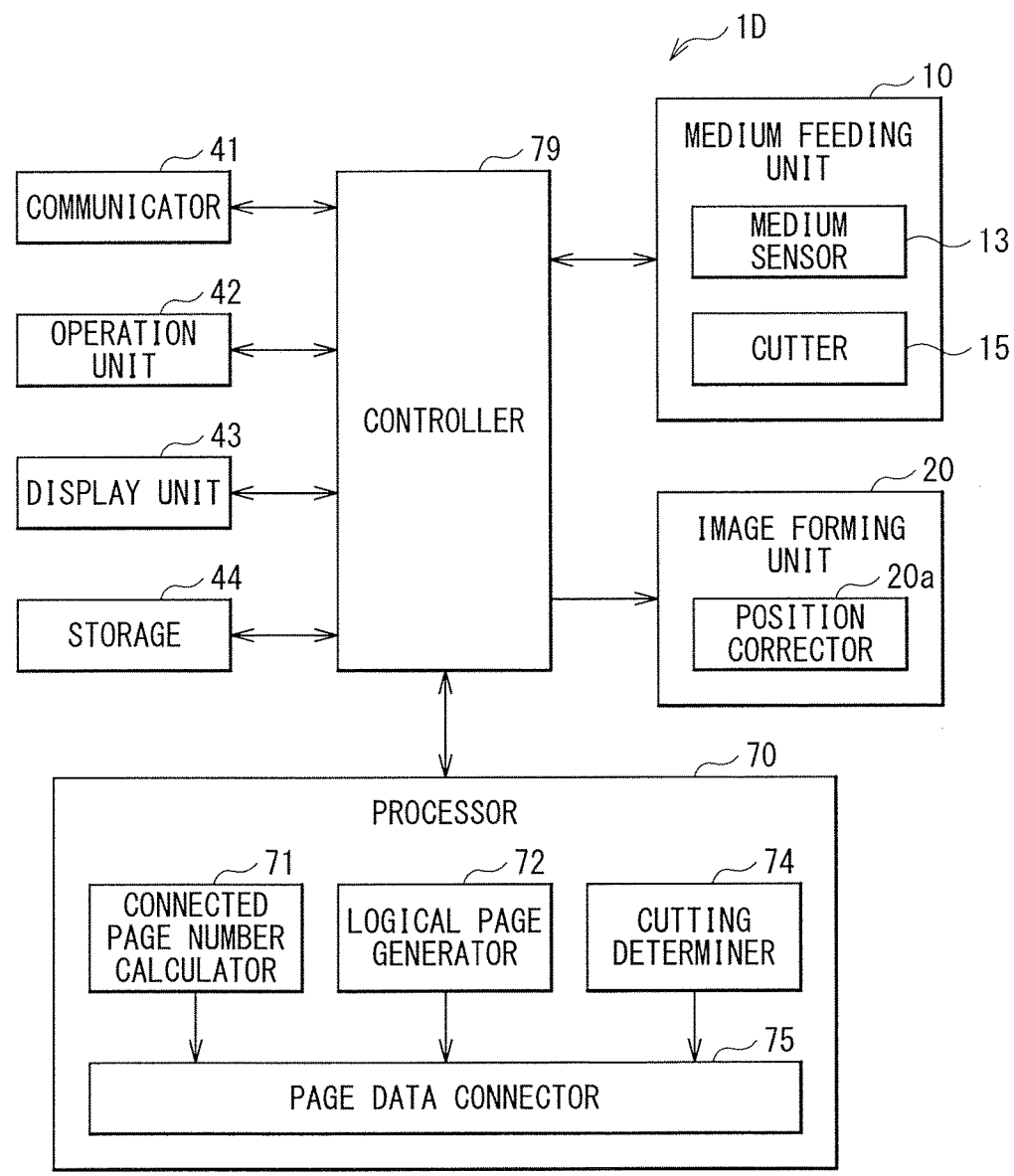
FIG. 16 is a block diagram illustrating a configuration example of a control mechanism of an image forming apparatus according to the still another modification example of the first example embodiment.

FIG. 16 illustrates a configuration example of the image forming apparatus 1D according to the present modification example. The image forming apparatus 1D may include a processor 70 and a controller 79. The print data DP received by the communicator 41 may be stored in the storage 44.

The processor 70 may generate image data on the basis of the print data DP stored in the storage 44. The processor 70 may include a connected page number calculator 71, a logical page generator 72, a cutting determiner 74, and a page data connector 75. The connected page number calculator 71 may correspond to the connected page number calculator 111 according to the foregoing first example embodiment. The connected page number calculator 71 may calculate the connected page number NPP on the basis of the page length LPP and the minimum medium length LMIN that are contained in the print data DP stored in the storage 44. The logical page generator 72 may correspond to the logical page generator 112 according to the foregoing first example embodiment. The logical page generator 72 may generate the logical page LP. The cutting determiner 74 may correspond to the cutting determiner 114 according to the foregoing first example embodiment. The cutting determiner 74 may determine whether to cut the recording medium 9 on the basis of the cutting page number NCUT contained in the print data DP stored in the storage 44. The page data connector 75 may correspond to the page data connector 115 according to the foregoing first example embodiment. The page data connector 75 may adjust the number of the pages PP contained in the logical page LP by connecting the page data contained in the print data DP stored in the storage 44 to the page data contained in the logical page LP and connecting the plurality of logical pages LP to each other. In this modification example, the processor 70 may correspond to the "image data generating circuitry" in one specific but non-limiting embodiment of the technology.

The controller 79 may control an overall operation of the image forming apparatus 1D by controlling respective operations of the communicator 41, the operation unit 42, the display unit 43, the storage 44, the medium feeding unit 10, the image forming unit 20, and the processor 70.

This configuration may allow the processor 70 to generate the image data on the basis of the print data DP stored in the storage 44. Further, the image forming unit 20 may form an image on the recording medium 9 on the basis of the generated image data, and the medium feeding unit 10 may cut the recording medium 9 on the basis of the generated image data.

Modification Example 1-5

In the foregoing first example embodiment, when the cutting page number NCUT is small, the error display may be performed in step S125. The user may be thereby prompted to re-enter the cutting page number NCUT. This is, however, non-limiting. Alternatively, for example, the image forming process performed by the image forming apparatus 1 may be suspended.

2. Second Example Embodiment

Next, a description is given of an information processor (a host computer 3) according to a second example embodiment. The second example embodiment is different from the foregoing first example embodiment in the method of adjusting the number of the pages PP contained in the logical page LP. It is to be noted that component parts that are substantially the same as those of the host computer 2 according to the foregoing first example embodiment are denoted with the same numerals and may not be described further where appropriate.

Figure 17:
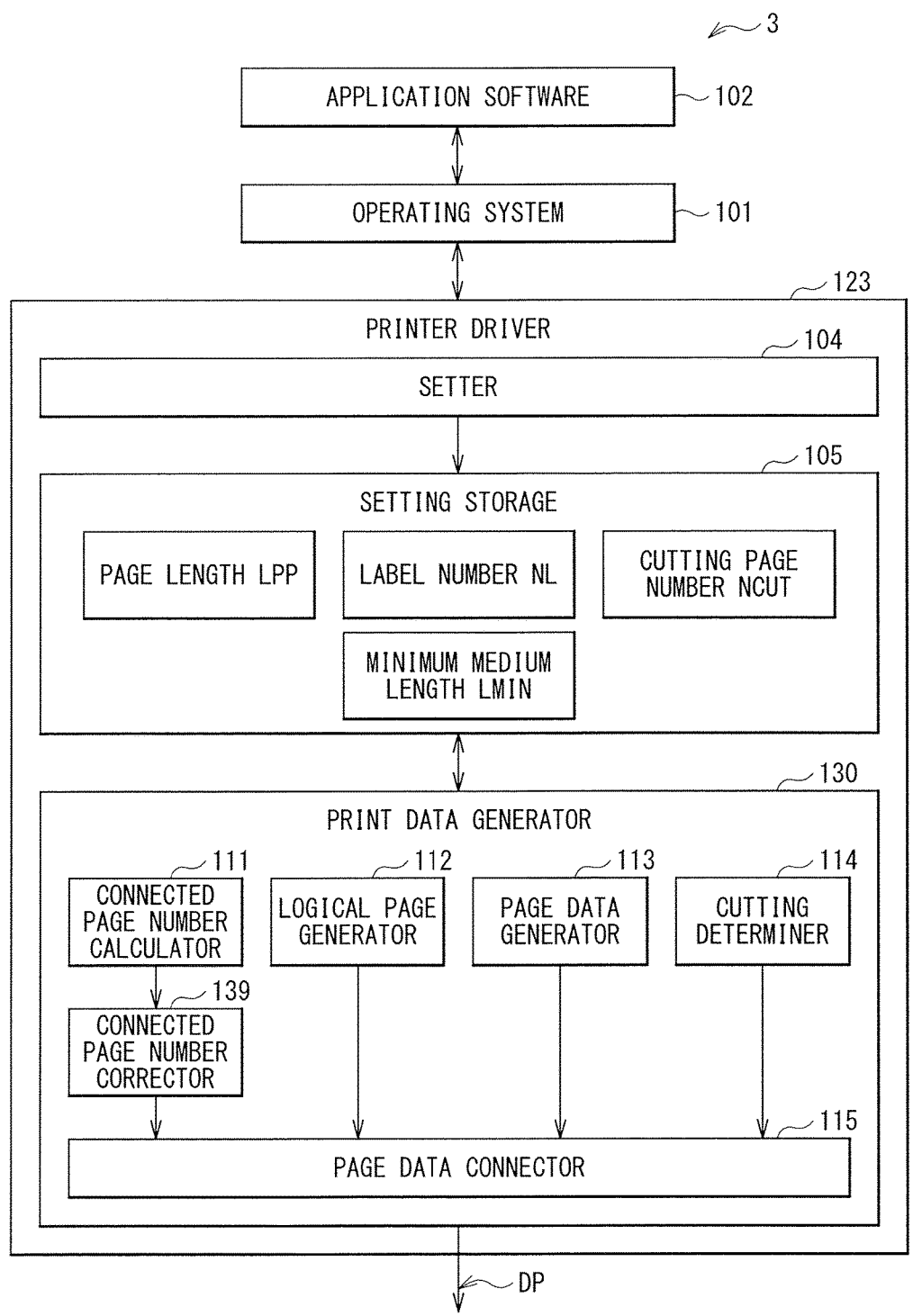
FIG. 17 is a block diagram illustrating an example of a software configuration of a host computer according to a second example embodiment of the technology.

FIG. 17 illustrates a software configuration of the host computer 3. A printer driver 123 may be installed on the host computer 3.

The printer driver 123 may include the setter 104, the setting storage 105, and a print data generator 130. The print data generator 130 may include the connected page number calculator 111, a connected page number corrector 139, the logical page generator 112, the page data generator 113, the cutting determiner 114, and the page data connector 115. The connected page number corrector 139 may correct the connected page number NPP calculated by the connected page number calculator 111.

In this example, the print data generator 130 may correspond to the "image data generating circuitry" in one specific but non-limiting embodiment of the technology. The page data connector 115 and the connected page number corrector 139 may correspond to the "page adjusting circuitry" in one specific but non-limiting embodiment of the technology.

The print data generator 130 of the printer driver 123 may generate the print data DP on the basis of the data supplied from the application software 102 and the information stored in the setting storage 105, as illustrated in FIG. 17.

Specifically, first, the connected page number calculator 111 and the connected page number corrector 139 of the print data generator 130 may calculate the connected page number NPP in step S131.

Figure 18:
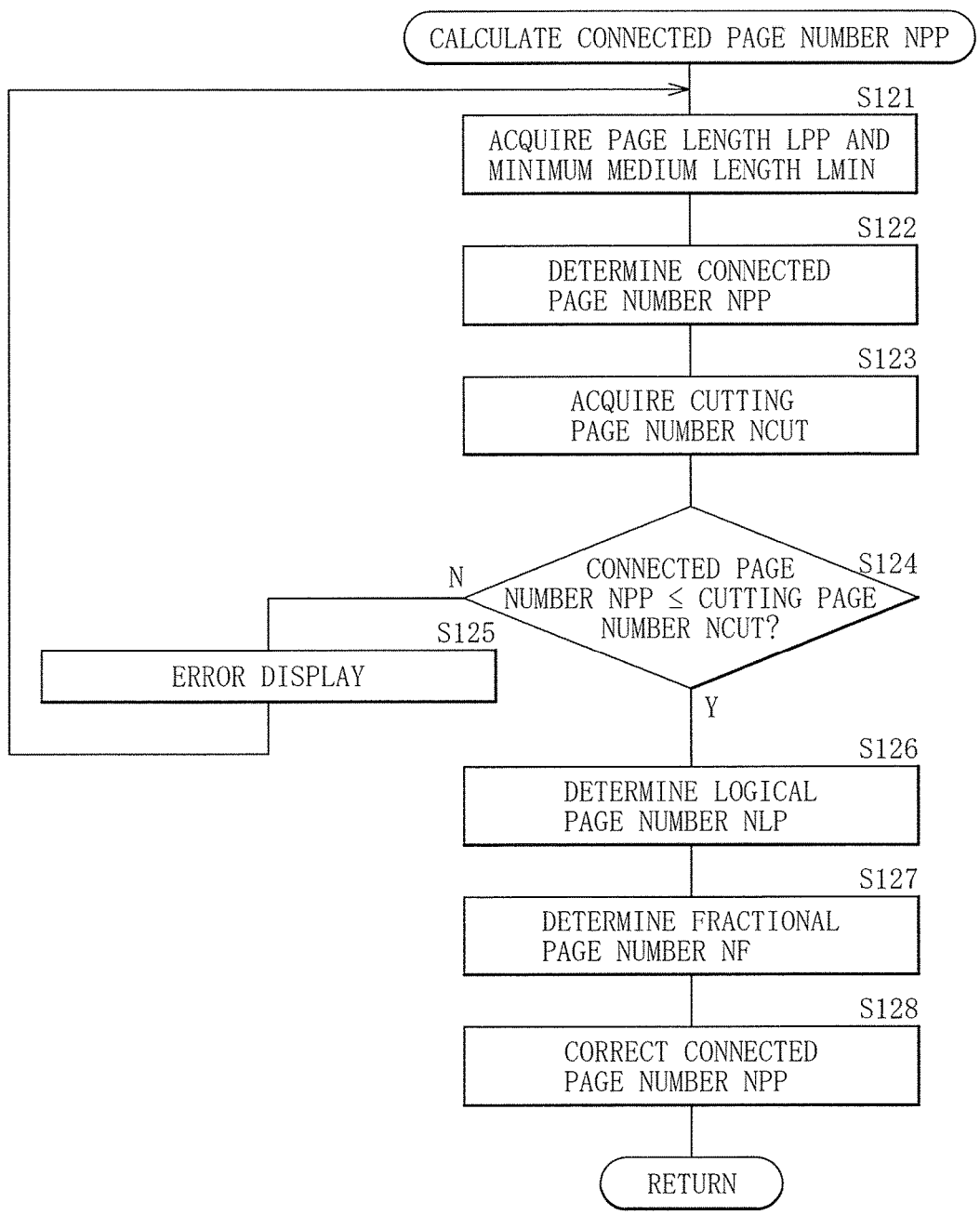
FIG. 18 is a flowchart illustrating an operation example of a printer driver illustrated in FIG. 17.

FIG. 18 illustrates an example of a process of calculating the connected page number NPP.

As with the first example embodiment, first, the connected page number calculator 111 may acquire the page length LPP and the minimum medium length LMIN from the setting storage 105 in step S121, and calculate the connected page number NPP on the basis of the acquired page length LPP and the acquired minimum medium length LMIN in step S122. Thereafter, the connected page number calculator 111 may acquire the cutting page number NCUT from the setting storage 105 in step S123, and confirm whether the connected page number NPP calculated in step S122 is equal to or smaller than the cutting page number NCUT, i.e., whether NPP≤NCUT is established in step S124. When the connected page number NPP is greater than the cutting page number NCUT, i.e., when "N" is determined in step S124, the printer driver 123 may cause the display 61 to perform error display in step S125, and the flow may return to step S121.

When the connected page number NPP is smaller than the cutting page number NCUT in step S124, i.e., when "Y" is determined in step S124, the connected page number corrector 139 may determine, in step S126, the logical page number NLP on the basis of the cutting page number NCUT and the connected page number NPP determined in step S122. Specifically, the connected page number corrector 139 may divide the cutting page number NCUT by the connected page number NPP (NCUT/NPP), and round down a result of the division to the nearest integer, thereby calculating the logical page number NLP.

Thereafter, in step S127, the connected page number corrector 139 may determine a fractional page number NF on the basis of the connected page number NPP determined in step S122 and the cutting page number NCUT. Specifically, the connected page number corrector 139 may divide the cutting page number NCUT by the connected page number NPP (NCUT/NPP), and set a fraction of a result of the division as the fractional page number NF.

Thereafter, in step S128, the connected page number corrector 139 may correct the connected page number NPP determined in step S122. Specifically, the connected page number corrector 139 may determine a correction value for the connected page number NPP by dividing the fractional page number NF determined in step S127 by the logical page number NLP determined in step S126, and rounding down a result of the division to the nearest integer. Further, the connected page number corrector 139 may add the determined correction value to the connected page number NPP. The connected page number corrector 139 may thereby correct the connected page number NPP.

This may bring the flow of the process of calculating the connected page number NPP to an end. Thereafter, the printer driver 123 may generate the print data DP by performing the processes in steps S102 to S112, as with the first example embodiment described above.

Next, operations of the printer driver 123 and the image forming apparatus 1 are described referring to specific but non-limiting examples.

Figure 19:
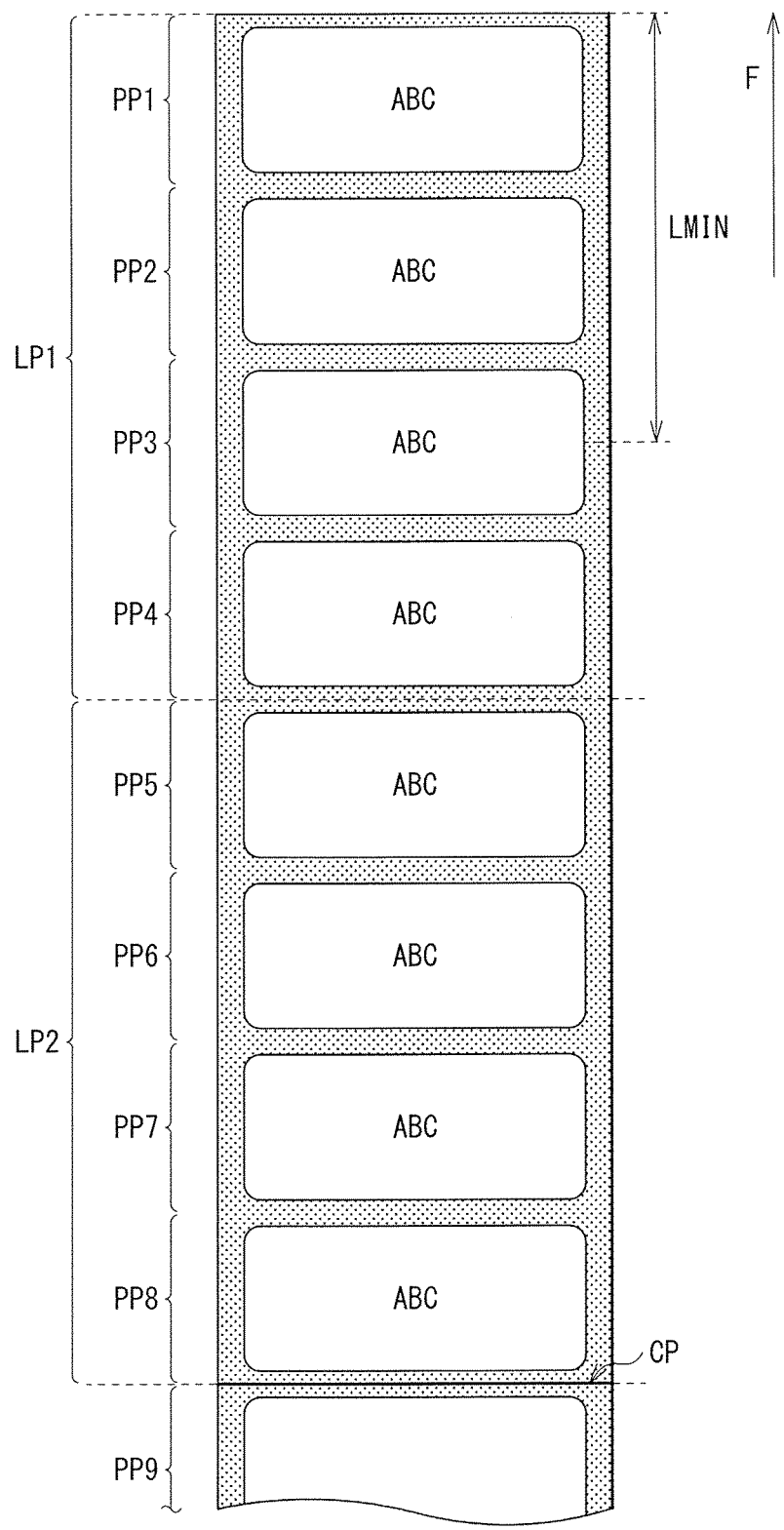
FIG. 19 describes the operation example of the printer driver illustrated in FIG. 17.

FIG. 19 illustrates an example of the recording medium 9 on which an image is formed on the basis of the print data DP generated by the printer driver 123. In this example, the cutting page number NCUT is set to "8", and the label number NL is set to "16". In this example case, the print data generator 130 generates a logical page LP1 containing four pages, i.e., pages PP1 to PP4, generates a logical page LP2 containing four pages, i.e., pages PP5 to PP8, and sets the cutting position CP immediately after the page PP8. Further, the print data generator 130 generates a logical page LP3 containing four pages, i.e., pages PP9 and PP12, generates a logical page LP4 containing four pages, i.e., pages PP13 to PP16, and sets the cutting position CP immediately after the page PP16. Further, the image forming apparatus 1 forms an image on the recording medium 9 on the basis of the print data DP thus generated, and cuts the recording medium 9. This operation is described below in detail.

First, a description is given of an example of an operation of the print data generator 130 of the printer driver 123.

The connected page number calculator 111 and the connected page number corrector 139 calculate the connected page number NPP in step S101. Specifically, first, in step S122, the connected page number calculator 111 calculates the connected page number NPP by dividing the minimum medium length LMIN by the page length LPP (LMIN/LPP) and rounding up the result of the division to the nearest integer. The connected page number NPP is "3" in this example. The value "3" of the connected page number NPP is smaller than the value "8" of the cutting page number NCUT, i.e., "Y" is determined in step S124. In step S126, the connected page number corrector 139 calculates the logical page number NLP by dividing the cutting page number NCUT by the connected page number NPP (NCUT/NPP), and rounding down a result of the division to the nearest integer. In this example, the cutting page number NCUT is "8", and the connected page number NPP is "3". Therefore, the logical page number NLP is "2". Thereafter, the connected page number corrector 139 divides the cutting page number NCUT by the connected page number NPP (NCUT/NPP), and sets a fraction of a result of the division as the fractional page number NF, in step S127. In this example, the cutting page number NCUT is "8", and the connected page number NPP is "3". Therefore, the fractional page number NF is "2". Thereafter, in step S128, the connected page number corrector 139 corrects the connected page number NPP by determining the correction value for the connected page number NPP and adding the determined correction value to the connected page number NPP. The connected page number corrector 139 performs the determination of the correction value for the connected page number NPP by dividing the fractional page number NF by the logical page number NLP (NF/NLP) and rounding down a fraction of a result of the division. In this example, the fractional page number NF is "2", and the logical page number NLP is "2". Therefore, the correction value is "1". As a result, the connected page number NPP is "4".

Thereafter, the page data generator 113 generates the page data of the initial page PP1 in step S102. Further, the logical page LP has not been generated yet, i.e., "Y" is determined in step S103. The logical page generator 112 therefore generates the initial logical page LP1 in step S105. Further, the print data generator 130 sets the variable N to "0" (zero) in step S106. Thereafter, the print data generator 130 performs increment of the variable N and thereby sets the variable N to "1" in step S108. Thereafter, the flow proceeds to a process for a subsequent page PP.

Thereafter, the page data generator 113 generates page data of the second page PP2 in step S102. The logical page LP1 has been generated already, i.e., "N" is determined in step S103, and the value "1" of the variable N is smaller than the value "4" of the connected page number NPP, i.e., "N" is determined in step S104. The page data connector 115 therefore connects the page data of the page PP2 to the page data contained in the logical page LP1, in step S107. Further, the print data generator 130 performs increment of the variable N, and thereby sets the variable N to "2" in step S108. Thereafter, the flow proceeds to a process for a subsequent page PP.

Thereafter, the page data generator 113 generates page data of the third page PP3 in step S102. The process for the third page PP3 is the same as the process for the page PP2. Upon the process for the third page PP3, the print data generator 130 performs increment of the variable N and thereby sets the variable N to "3" in step S108. Thereafter, the flow proceeds to a process for a subsequent page PP.

Thereafter, the page data generator 113 generates page data of the fourth page PP4 in step S102. The process for the fourth page PP4 is the same as the processes for the respective pages PP2 and PP3. Upon the process for the fourth page PP4, the print data generator 130 performs increment of the variable N and thereby sets the variable N to "4" in step S108. Thereafter, the flow proceeds to a process for a subsequent page PP.

Thereafter, the page data generator 113 generates page data of the fifth page PP5 in step S102. The logical page LP1 has been generated already, i.e., "N" is determined in step S103, and the value "4" of the variable N is equal to the value "4" of the connected page number NPP, i.e., "Y" is determined in step S104. The logical page generator 112 therefore generates the second logical page LP2 in step S105. Further, the print data generator 130 sets the variable N to "0" (zero) in step S106. Thereafter, the print data generator 130 performs increment of the variable N and thereby sets the variable N to "1" in step S108. Thereafter, the flow proceeds to a process for a subsequent page PP.

Thereafter, the page data generator 113 generates page data of the sixth page PP6 in step S102. The logical page LP2 has been generated already, i.e., "N" is determined in step S103, and the value "1" of the variable N is smaller than the value "4" of the connected page number NPP, i.e., "N" is determined in step S104. The page data connector 115 therefore connects the page data of the page PP6 to the page data contained in the logical page LP2 in step S107. Further, the print data generator 130 performs increment of the variable N, and thereby sets the variable N to "2" in step S108. Thereafter, the flow proceeds to a process for a subsequent page PP.

Thereafter, the page data generator 113 generates page data of the seventh page PP7 in step S102. The process for the seventh page PP7 is the same as the process for the page PP6. Upon the process for the seventh page PP7, the print data generator 130 performs increment of the variable N and thereby sets the variable N to "3" in step S108. Thereafter, the flow proceeds to a process for a subsequent page PP.

Thereafter, the page data generator 113 generates page data of the eighth page PP8 in step S102. The logical page LP2 has been generated already, i.e., "N" is determined in step S103, and the value "3" of the variable N is smaller than the value "4" of the connected page number NPP, i.e., "N" is determined in step S104. The page data connector 115 therefore connects the page data of the page PP8 to the page data contained in the logical page LP2 in step S107. Further, the print data generator 130 performs increment of the variable N, and thereby sets the variable N to "4" in step S108. The cutting determiner 114 determines that the cutting is to be performed immediately after the page PP8, i.e., "Y" is determined in step S109, on the ground that the cutting page number NCUT is "8". At this time, the value "4" of the variable N is equal to the value "4" of the connected page number NPP, i.e., "Y" is determined in step S110. The page data connector 115 therefore does not connect the logical pages LP to each other. The processes for all of the pages PP have not been completed yet, i.e., "N" is determined in step S112. The flow therefore proceeds to a process for a subsequent page PP.

Thereafter, the page data generator 113 generates page data of the ninth page PP9 in step S102. The logical page LP2 has been generated already, i.e., "N" is determined in step S103, and the value "4" of the variable N is equal to the value "4" of the connected page number NPP, i.e., "Y" is determined in step S104. The logical page generator 112 therefore generates the third logical page LP3 in step S105. Further, the print data generator 130 sets the variable N to "0" (zero) in step S106. Thereafter, the print data generator 130 performs increment of the variable N and thereby sets the variable N to "1" in step S108. Thereafter, the flow proceeds to a process for a subsequent page PP.

Thereafter, the print data generator 130 also performs processes similar to the foregoing processes. Specifically, the print data generator 130 generates the logical page LP3 containing the four pages PP9 to PP12, and generates the logical page LP4 containing the four pages PP13 to PP16. Further, the process for the page PP16 is completed. Accordingly, the processes for all of the pages PP are completed, i.e., "Y" is determined in step S112. The flow is thereby brought to an end. The printer driver 123 may generate the print data DP as described above. Further, the host computer 3 may transmit the print data DP thus generated to the image forming apparatus 1.

Next, a description is given of a specific but non-limiting example of the operation of the image forming apparatus 1. The image forming apparatus 1 forms an image on the recording medium 9 and cuts the recording medium 9 on the basis of the print data DP transmitted from the host computer 3.

First, the medium feeding roller 12 and the conveying rollers 14, 16, and 31 convey the recording medium 9 along the conveyance path 8. The medium sensor 13 detects the labels 9a of the recording medium 9. The position corrector 20a of the image forming unit 20 first corrects the writing start position, on the recording medium 9, of the logical page LP1, on the basis of the result of the detection performed by the medium sensor 13. Further, the image forming unit 20 forms images on the respective four labels 9a of the recording medium 9, on the basis of the data of the logical page LP1. Thereafter, the position corrector 20a of the image forming unit 20 corrects the writing start position, on the recording medium 9, of the logical page LP2, on the basis of the result of the detection performed by the medium sensor 13. Further, the image forming unit 20 forms images on the respective four labels 9a of the recording medium 9, on the basis of the data of the logical page LP2. Further, the cutter 15 cuts the recording medium 9 at the cutting position CP that is located immediately after the page PP8.

Thereafter, the position corrector 20a of the image forming unit 20 corrects the writing start position, on the recording medium 9, of the logical page LP3, on the basis of the result of the detection performed by the medium sensor 13.

Further, the image forming unit 20 forms images on the respective four labels 9a of the recording medium 9, on the basis of the data of the logical page LP3. Thereafter, the position corrector 20a of the image forming unit 20 corrects the writing start position, on the recording medium 9, of the logical page LP4, on the basis of the result of the detection performed by the medium sensor 13. Further, the image forming unit 20 forms images on the respective four labels 9a of the recording medium 9, on the basis of the data of the logical page LP4. Further, the cutter 15 cuts the recording medium 9 at the cutting position CP that is located immediately after the page PP16.

As described above, the printer driver 123 may correct the connected page number NPP in step S128 in FIG. 18. It is therefore possible to suppress misalignment of an image formation position, on the recording medium 9, at which an image is formed, as described below.

Figure 20:
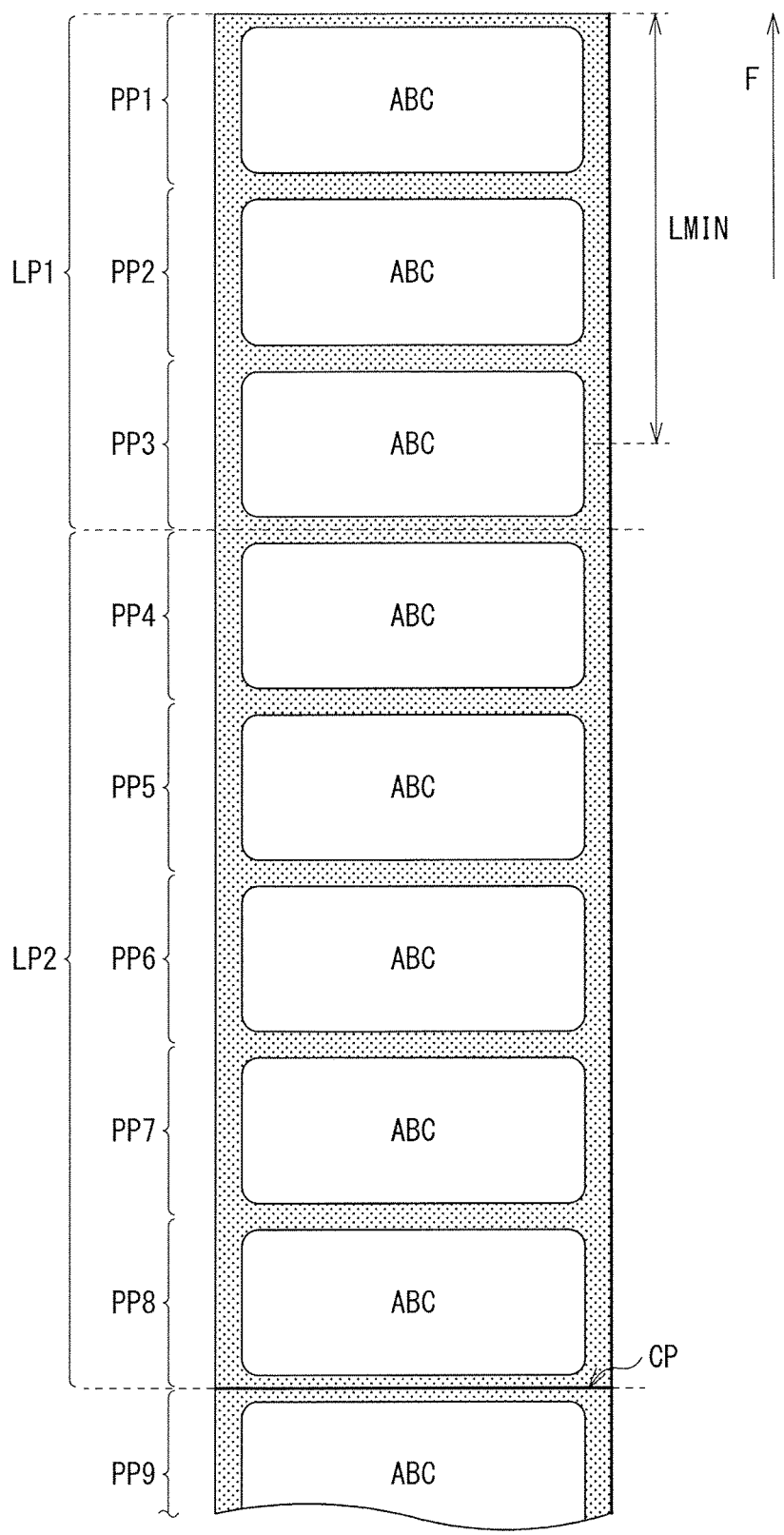
FIG. 20 describes still another operation example of the printer driver illustrated in FIG. 6.

For example, when the printer driver 103 according to the first example embodiment sets the connected page number NPP to "3" and the cutting page number NCUT to "8" as with the foregoing second example embodiment, the number of the pages PP contained in the logical page LP2 is "5" as illustrated in FIG. 20. The image forming apparatus 1 may correct the writing start position, on the recording medium 9, of the logical page LP2 on the basis of the result of the detection performed by the medium sensor 13, and thereafter form images on the respective five labels 9a of the recording medium 9 on the basis of the data of the logical page LP2. Accordingly, the image formation position may be possibly misaligned, for example, for the last label 9a of the foregoing five labels 9a.

In contrast, the printer driver 123 according to the second example embodiment may correct the connected page number NPP by distributing the pages of the fractional page number NF to a plurality of logical pages LP. This allows the printer driver 123 to decrease the possibility that the number of the pages PP is greater in a particular logical page LP. Hence, it is possible to suppress misalignment of the image formation position.

According to the second example embodiment, the connected page number may be corrected as described above. Hence, it is possible to suppress misalignment of the image formation position. Other effects may be similar to or the same as those in the foregoing first example embodiment.

Modification Example 2-1

In the foregoing second example embodiment, upon the correction of the connected page number NPP, first, the logical page number NLP and the fractional page number NF may be determined in steps 126 and 127, respectively. Thereafter, the correction value may be determined on the basis of the determined logical page number NLP and the determined fractional page number NF in step S128. Further, the determined correction value may be added to the connected page number NPP in step S129. This is, however, non-limiting. The connected page number NPP may be determined by any method as long as the process is so performed as to distribute the pages PP of the fractional page number NF to a plurality of logical pages LP.

Modification Example 2-2

Each of the foregoing modification examples of the first example embodiment is also applicable to the technique according to the foregoing second example embodiment.

3. Third Example Embodiment

Next, a description is given of an image forming system (an image forming system 200) according to a third example embodiment of the technology. According to the third example embodiment, the host computer may generate the logical page LP, and the image forming apparatus may adjust the number of the pages PP contained in the logical page LP. It is to be noted that component parts that are substantially the same as those of the host computer 2 and the image forming apparatus 1 according to the foregoing first example embodiment are denoted with the same numerals and may not be described further where appropriate.

Figure 21:
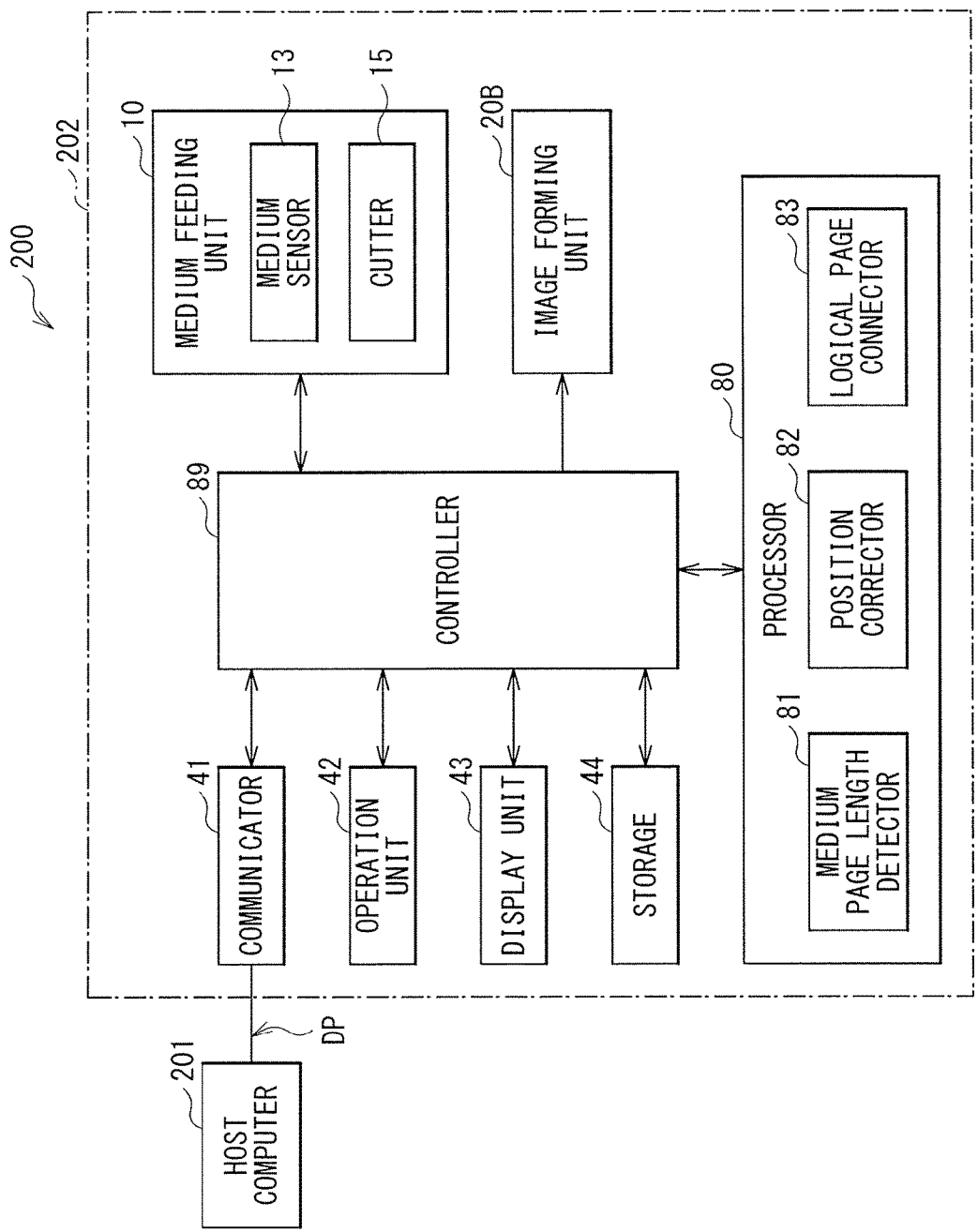
FIG. 21 is a block diagram illustrating a configuration example of an image forming system according to a third example embodiment.

FIG. 21 illustrates a configuration example of the image forming system 200. The image forming system 200 may include a host computer 201 and an image forming apparatus 202.

Figure 22:
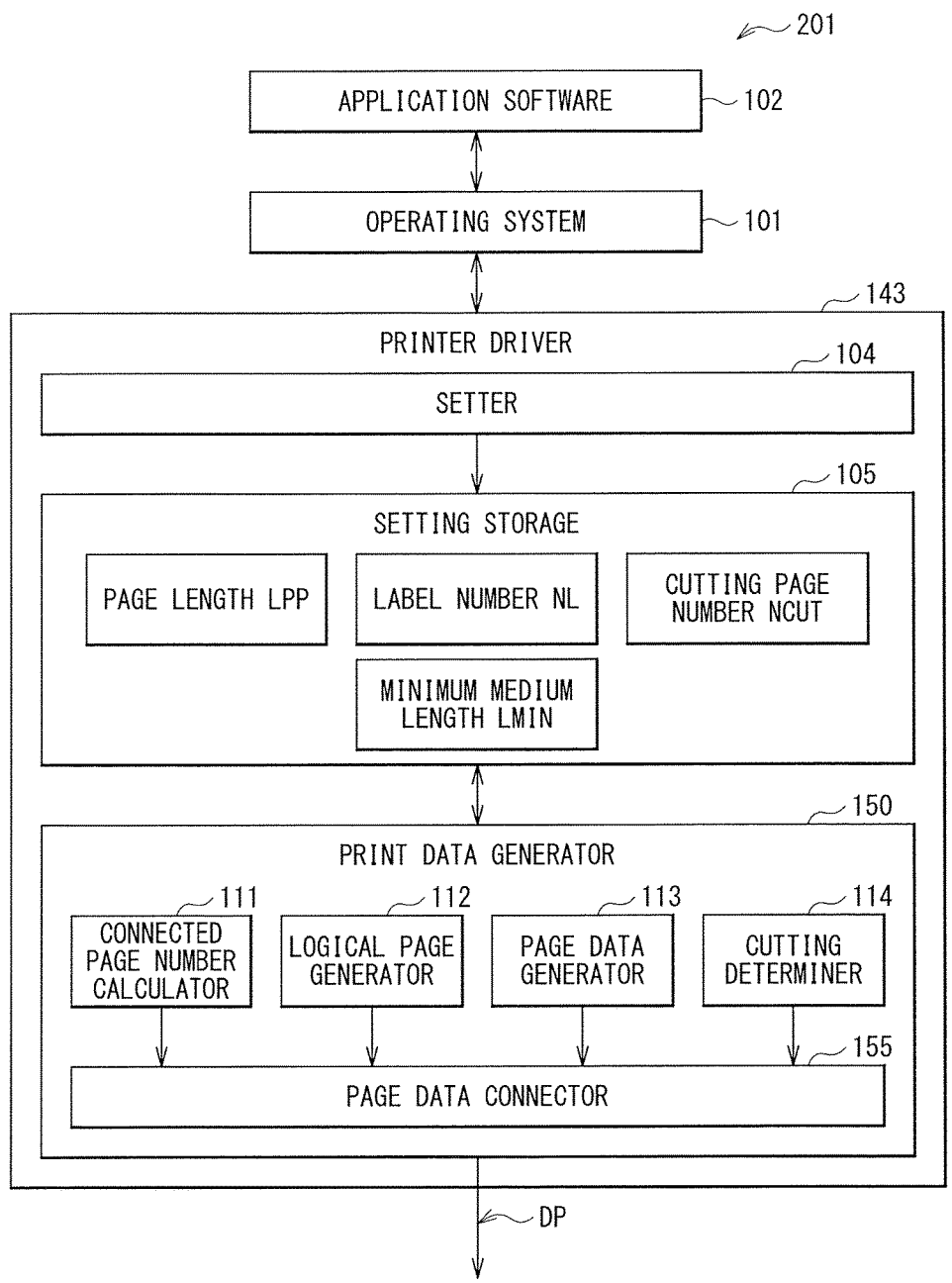
FIG. 22 is a block diagram illustrating an example of a software configuration of a host computer illustrated in FIG. 21.

FIG. 22 illustrates an example of a software configuration of the host computer 201. A printer driver 143 may be installed on the host computer 201. The printer driver 143 may include a print data generator 150. The print data generator 150 may include a page data connector 155.

The page data connector 155 may connect the page data generated by the page data generator 113 to the page data contained in the logical page LP. The page data connector 155 may be similar to the page data connector 115 according to the first example embodiment except that the page data connector 155 does not have the function of adjusting the number of the pages PP contained in the logical page LP by connecting a plurality of logical pages LP to each other.

Referring to FIG. 21, the image forming apparatus 202 may include a processor 80, an image forming unit 20B, and a controller 89.

The processor 80 may sequentially generate image data D1 for each of a plurality of logical pages LP on the basis of the logical pages LP contained in the print data DP. Further, the processor 80 may generate print image data D2 on the basis of the generated pieces of image data D1. The processor 80 may include a medium page length detector 81, a position corrector 82, and a logical page connector 83.

The medium page length detector 81 may detect, on the basis of the result of the detection performed by the medium sensor 13, a page length ML, of the recording medium 9, corresponding to the logical page length LLP. Specifically, the medium page length detector 81 may detect a pitch of the labels 9a of the recording medium 9 on the basis of the result of the detection performed by the medium sensor 13, for example. Further, the medium page length detector 81 may determine the page length ML on the basis of a result of the detection of the pitch of the labels 9a of the recording medium 9. In one example, the medium page length detector 81 may detect the page length ML on the basis of a result of the detection of the labels 9a performed through the operation of the medium sensor 13 as the transmission sensor 131. Further, in another example where the markers indicating the respective positions of the labels 9a are printed on the back surface of the mount 9b of the recording medium 9, the medium page length detector 81 may detect the page length ML on the basis of the result of the detection of the labels 9a performed through the operation of the medium sensor 13 as the reflection sensor 132.

The position corrector 82 may correct each of the lengths of the logical pages LP by using the logical pages LP contained in the image data D1 as a reference. Specifically, first, the position corrector 82 may determine a correction value CLn on the basis of a result of the detection performed by the medium page length detector 81. Further, the position corrector 82 may correct the length of the logical page LP by using the logical pages LP contained in the image data D1 as a reference. The position corrector 82 may correct the length of the logical page LP by increasing or decreasing, on the basis of the correction value CLn, a margin at a rear end of the last logical page LP contained in the print image data D2. The image forming apparatus 202 may be able to thereby correct each of the writing start positions, on the recording medium 9, of the logical pages LP.

The logical page connector 83 may adjust the number of the pages PP contained in the logical page LP by connecting a plurality of logical pages LP to each other.

The image forming unit 20B may form an image on the recording medium 9 on the basis of the print image data D2, by using the logical pages LP contained in the print image data D2 as a reference.

The controller 89 may control an overall operation of the image forming apparatus 202 by controlling respective operations of the communicator 41, the operation unit 42, the display unit 43, the storage 44, the medium feeding unit 10, the image forming unit 20B, and the processor 80.

In this example, the host computer 201 may correspond to the "information processor" in one specific but non-limiting embodiment of the technology. The print data generator 150 may correspond to a "first image data generating circuitry" in one specific but non-limiting embodiment of the technology. The logical page generator 112 may correspond to a "logical page generating circuitry" in one specific but non-limiting embodiment of the technology. The print data DP may correspond to "first image data" in one specific but non-limiting embodiment of the technology. The processor 80 may correspond to a "second image data generating circuitry" in one specific but non-limiting embodiment of the technology. The position corrector 82 may correspond to a "corrector" in one specific but non-limiting embodiment of the technology. The logical page connector 83 may correspond to the "page adjusting circuitry" in one specific but non-limiting embodiment of the technology. The medium page length detector 81 may correspond to a "detector" in one specific but non-limiting embodiment of the technology. The print image data D2 may correspond to "second image data" in one specific but non-limiting embodiment of the technology.

[Host Computer 201]

Figure 23:
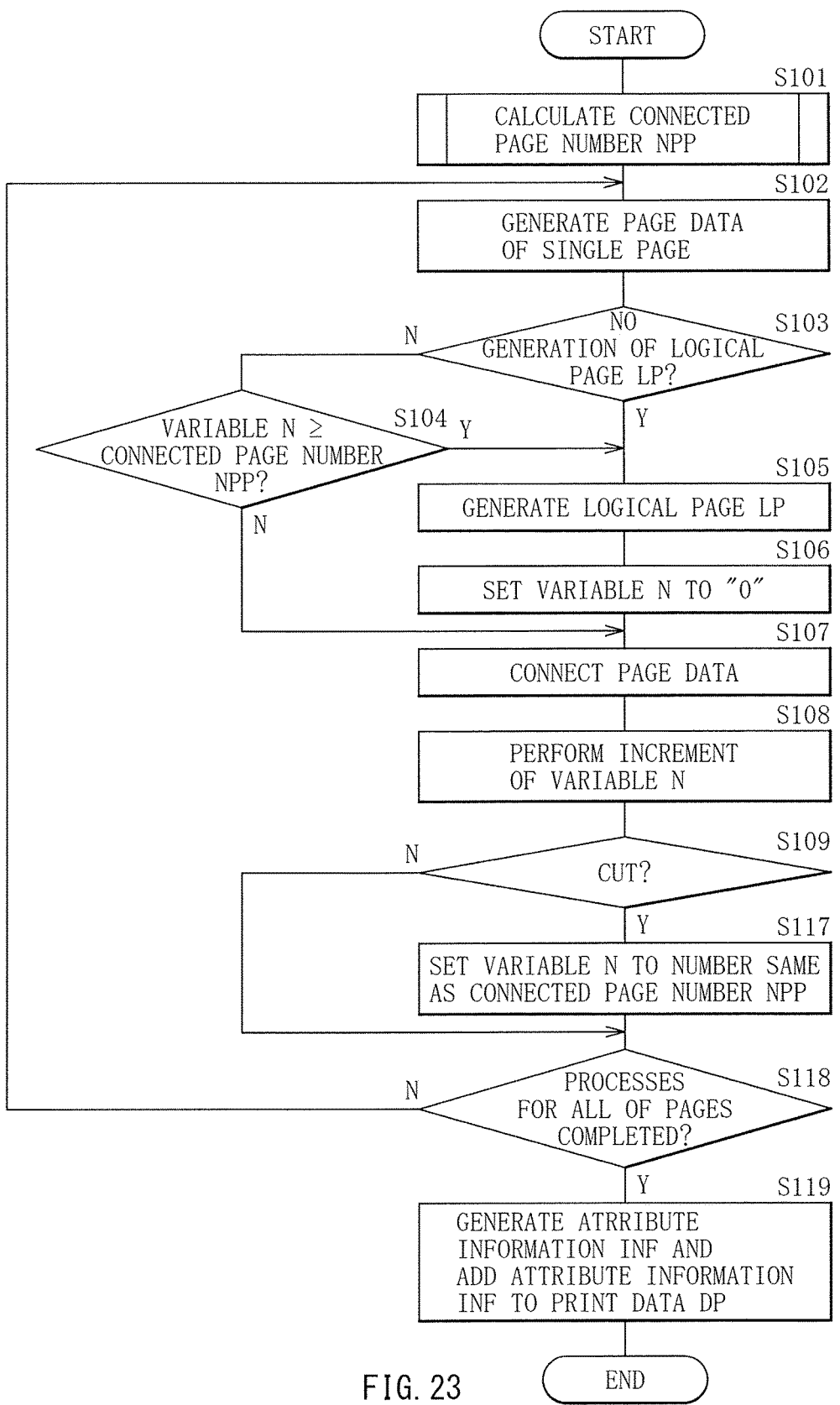
FIG. 23 is a flowchart illustrating an operation example of a printer driver illustrated in FIG. 22.

FIG. 23 illustrates an operation example of the print data generator 150 of the host computer 201.

First, the connected page number calculator 111 of the print data generator 150 may calculate the connected page number NPP in step S101 as with the operation example of the first example embodiment illustrated in FIGS. 8 and 9.

Thereafter, in step S102, the page data generator 113 may generate the page data of the single page PP on the basis of the data supplied from the application software 102.

Thereafter, in step S103, the page data connector 155 may confirm whether the logical page LP has not been generated yet. When the logical page LP has been already generated, i.e., when "N" is determined in step S103, the page data connector 155 may confirm whether the variable N is equal to or greater than the connected page number NPP, i.e., whether N≥NPP is established, in step S104. When the variable N is smaller than the connected page number NPP, i.e., when "N" is determined in step S104, the flow may proceed to step S107.

When the logical page LP has not yet been generated in step S103, i.e., when "Y" is determined in step S103, or when the variable N is equal to or greater than the connected page number NPP in step S104, i.e., when "Y" is determined in step S104, the logical page generator 112 may generate the logical page LP in step S105. Thereafter, the print data generator 150 may set the variable N to "0" (zero) in step S106.

Thereafter, the page data connector 155 may connect the page data generated in step S102 to the page data contained in the current logical page LP in step S107. Further, the print data generator 150 may perform increment of the variable N in step S108.

Thereafter, the cutting determiner 114 may determine whether to perform cutting immediately after the current page PP, on the basis of the cutting page number NCUT in step S109. When the cutting is not to be performed immediately after the current page PP, i.e., when "N" is determined in step S109, the flow may proceed to step S118.

When the cutting is to be performed immediately after the current page PP, i.e., when "Y" is determined in step S109, the print data generator 150 may set the value of the variable N to a value same as the value of the connected page number NPP, in step S117. Specifically, when the cutting is to be performed immediately after the current page PP, the print data generator 150 may set the value of the variable N to a value same as the value of the connected page number NPP, in order to end the current logical page LP. Further, the cutting determiner 114 may set the cutting position CP.

Thereafter, the print data generator 150 may confirm whether the processes for all of the pages PP have been completed, on the basis of the label number NL stored in the setting storage 105, in step S118. When the processes for all of the pages PP have not been completed yet, i.e., when "N" is determined in step S112, the flow may return to step S102, and the processes in steps S102 to S109, S117, and S118 may be repeatedly performed until the processes for all of the pages PP are completed.

When the processes for all of the pages PP have been completed in step S118, i.e., when "Y" is established in step S118, the print data generator 150 may generate attribute information INF in step S119. The attribute information INF may include the connected page number NPP, connected page number N1 for each of the logical pages LP, and a page length DL of each of the logical pages LP, for example. The connected page number N1 may be the number of the pages PP contained in each of the logical pages LP. The page length DL may be the logical page length LLP of each of the logical pages LP. The page length DL may be calculated on the basis of the page length LPP of the page PP and the connected page number N1 for each of the logical pages LP that are stored in the setting storage 105, for example. Further, the print data generator 150 may add the attribute information INF to the print data DP.

This may bring the flow to an end. The print data generator 150 may generate the print data DP as described above.

Next, an operation of the printer driver 143 is described referring to a specific but non-limiting example.

Figure 24:
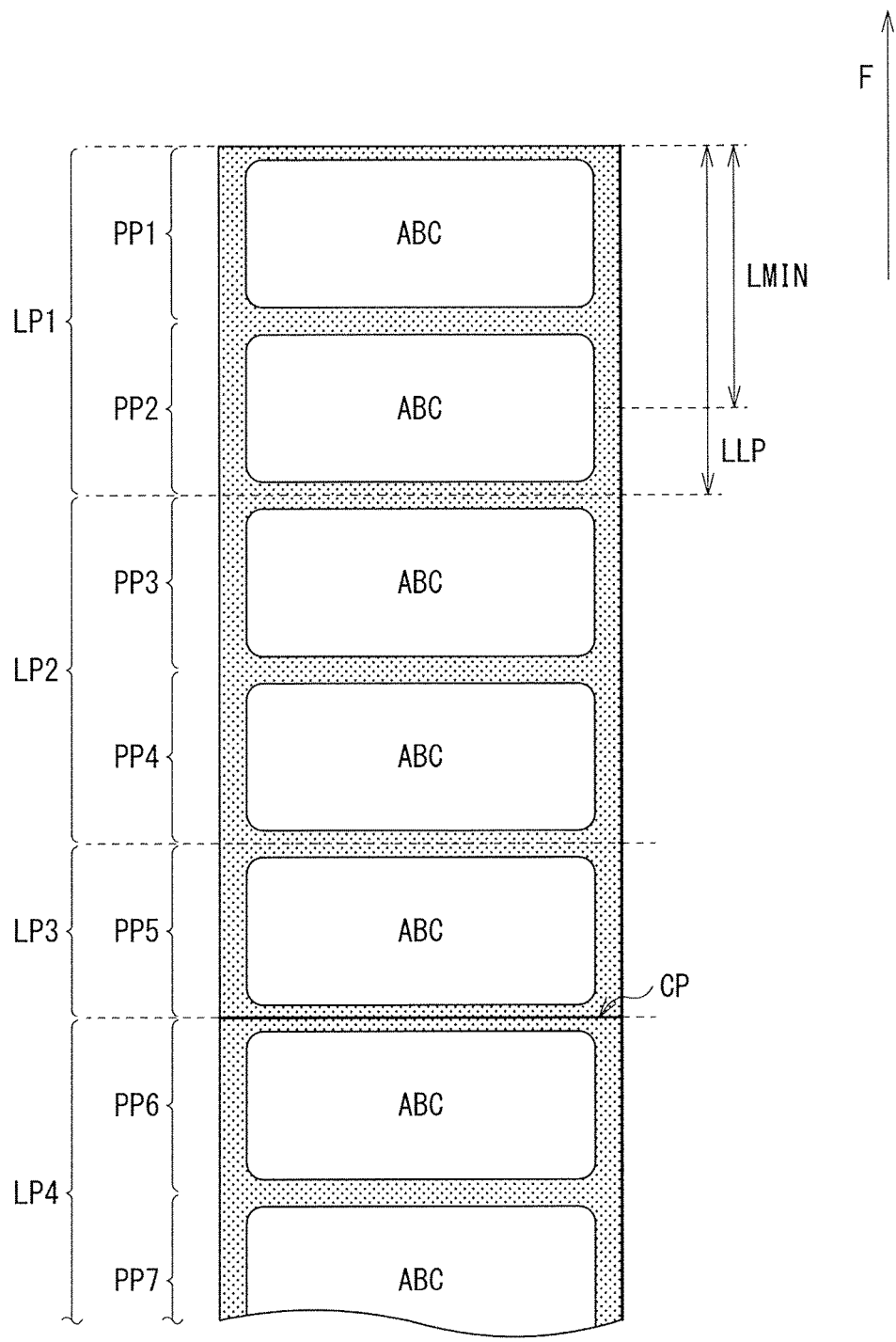
FIG. 24 describes the operation example of the printer driver illustrated in FIG. 22.

FIG. 24 schematically illustrates an example of a configuration of the logical page LP in the print data DP generated by the printer driver 143. In this example, the cutting page number NCUT is set to "5", and the label number NL is set to "10". In this example case, the print data generator 150 generates a logical page LP1 containing two pages, i.e., pages PP1 and PP2, generates a logical page LP2 containing two pages, i.e., pages PP3 and PP4, generates a logical page LP3 containing a single page PP5, and sets the cutting position CP immediately after the page PP5. Further, the print data generator 150 generates a logical page LP4 containing two pages, i.e., pages PP6 and PP7, a logical page LP5 containing two pages, i.e., pages PP8 and PP9, and a logical page LP6 containing a single page PP10, and sets the cutting position CP immediately after the page PP10. This operation is described below in detail.

First, the connected page number calculator 111 calculates the connected page number NPP in step S101. The connected page number NPP is "2" in this example.

Thereafter, the page data generator 113 generates the page data of the initial page PP1 in step S102. Further, the logical page LP has not been generated yet, i.e., "Y" is determined in step S103. The logical page generator 112 therefore generates the initial logical page LP1 in step S105. Further, the print data generator 150 sets the variable N to "0" (zero) in step S106. Thereafter, the print data generator 150 performs increment of the variable N and thereby sets the variable N to "1" in step S108. Cutting is not performed immediately after the page PP1, i.e., "N" is determined in step S109. Further, processes for all of the pages PP have not been completed yet, i.e., "N" is determined in step S118. The flow therefore proceeds to a process for a subsequent page PP.

Thereafter, the page data generator 113 generates page data of the second page PP2 in step S102. The logical page LP1 has been generated already, i.e., "N" is determined in step S103, and the value "1" of the variable N is smaller than the value "2" of the connected page number NPP, i.e., "N" is determined in step S104. The page data connector 155 therefore connects the page data of the page PP2 to the page data contained in the logical page LP1 in step S107. Further, the print data generator 150 performs increment of the variable N, and thereby sets the variable N to "2" in step S108. The cutting is not performed immediately after the page PP2, i.e., "N" is determined in step S109. The processes for all of the pages PP have not been completed yet, i.e., "N" is determined in step S118. The flow therefore proceeds to a process for a subsequent page PP.

Thereafter, the page data generator 113 generates page data of the third page PP3 in step S102. The logical page LP1 has been generated already, i.e., "N" is determined in step S103, and the value "2" of the variable N is equal to the value "2" of the connected page number NPP, i.e., "Y" is determined in step S104. The logical page generator 112 therefore generates the second logical page LP2 in step S105. Further, the print data generator 150 sets the variable N to "0" (zero) in step S106. Thereafter, the print data generator 150 performs increment of the variable N and thereby sets the variable N to "1" in step S108. The cutting is not performed immediately after the page PP3, i.e., "N" is determined in step S109. The processes for all of the pages PP have not been completed yet, i.e., "N" is determined in step S118. The flow therefore proceeds to a process for a subsequent page PP.

Thereafter, the page data generator 113 generates page data of the fourth page PP4 in step S102. The logical page LP2 has been generated already, i.e., "N" is determined in step S103, and the value "1" of the variable N is smaller than the value "2" of the connected page number NPP, i.e., "N" is determined in step S104. The page data connector 155 therefore connects the page data of the page PP4 to the page data contained in the logical page LP2 in step S107. Further, the print data generator 150 performs increment of the variable N, and thereby sets the variable N to "2" in step S108. The cutting is not performed immediately after the page PP4, i.e., "N" is determined in step S109. The processes for all of the pages PP have not been completed yet, i.e., "N" is determined in step S118. The flow therefore proceeds to a process for a subsequent page PP.

Thereafter, the page data generator 113 generates page data of the fifth page PP5 in step S102. The logical page LP2 has been generated already, i.e., "N" is determined in step S103, and the value "2" of the variable N is equal to the value "2" of the connected page number NPP, i.e., "Y" is determined in step S104. The logical page generator 112 therefore generates the third logical page LP3 in step S105. Further, the print data generator 150 sets the variable N to "0" (zero) in step S106. Thereafter, the print data generator 150 performs increment of the variable N and thereby sets the variable N to "1" in step S108. The cutting determiner 114 determines that the cutting is to be performed immediately after the page PP5, i.e., "Y" is determined in step S109, on the ground that the cutting page number NCUT is "5". The print data generator 150 sets the value of the variable N to a value of "2" that is the same as the value of the connected page number NPP in step S117, and sets the cutting position CP immediately after the page PP5. The processes for all of the pages PP have not been completed yet, i.e., "N" is determined in step S118. The flow therefore proceeds to a process for a subsequent page PP.

Thereafter, the page data generator 113 generates page data of the sixth page PP6 in step S102. The logical page LP3 has been generated already, i.e., "N" is determined in step S103, and the value "2" of the variable N is equal to the value "2" of the connected page number NPP, i.e., "Y" is determined in step S104. The logical page generator 112 therefore generates the fourth logical page LP4 in step S105. Further, the print data generator 150 sets the variable N to "0" (zero) in step S106. Thereafter, the print data generator 150 performs increment of the variable N and thereby sets the variable N to "1" in step S108. The cutting is not performed immediately after the page PP6, i.e., "N" is determined in step S109. The processes for all of the pages PP have not been completed yet, i.e., "N" is determined in step S118. The flow therefore proceeds to a process for a subsequent page PP.

Thereafter, the print data generator 150 performs processes similar to the foregoing processes. Specifically, the print data generator 150 generates the logical page LP4 containing the two pages PP6 and PP7, generates the logical page LP5 containing the two pages PP8 and PP9, and generates the logical page LP6 containing the single page PP10. Further, the process for the page PP10 is completed. Accordingly, the processes for all of the pages PP are completed, i.e., "Y" is determined in step S118.

Further, the print data generator 150 generates the attribute information INF in step S119. In this example, the value of the connected page number NPP is "2". Further, the value of the connected page number N1 of the logical page LP1 is "2", the value of the connected page number N1 of the logical page LP2 is "2", the value of the connected page number N1 of the logical page LP3 is "1", the value of the connected page number N1 of the logical page LP4 is "2", the value of the connected page number N1 of the logical page LP5 is "2", and the value of the connected page number N1 of the logical page LP6 is "1". Further, the value of the page length DL of the logical page LP1 is "2×LPP", the value of the page length DL of the logical page LP2 is "2×LPP", the value of the page length DL of the logical page LP3 is "LPP", the value of the page length DL of the logical page LP4 is "2×LPP", the value of the page length DL of the logical page LP5 is "2×LPP", and the value of the page length DL of the logical page LP6 is "LPP". Further, the print data generator 150 adds the generated attribute information INF to the print data DP.

The printer driver 143 may generate the print data DP as described above. Further, the host computer 201 may transmit the generated print data DP to the image forming apparatus 202. The communicator 41 of the image forming apparatus 202 may receive the print data DP, and the controller 89 may cause the storage 44 to store the received print data DP.

[Image Forming Apparatus 202]

Figure 25:
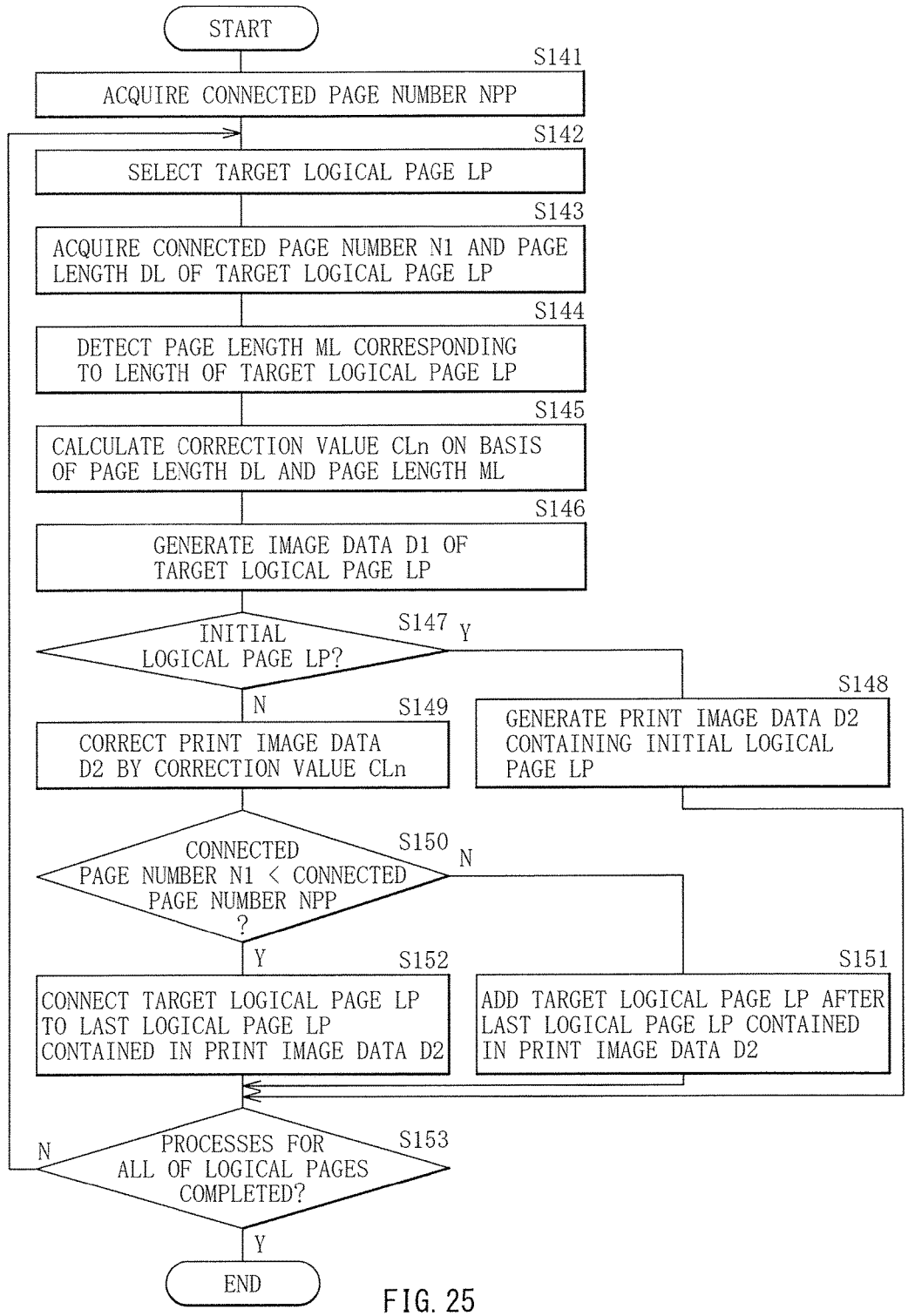
FIG. 25 is a flowchart illustrating an operation example of a processor illustrated in FIG. 21.

FIG. 25 illustrates an operation example of the processor 80 of the image forming apparatus 202. The processor 80 may sequentially generate pieces of image data D1 for the respective logical pages LP on the basis of the plurality of logical pages LP contained in the print data DP. Further, the processor 80 may generate the print image data D2 on the basis of the generated pieces of image data D1.

First, the processor 80 may acquire the connected page number NPP from the attribute information INF in the print data DP in step S141.

Thereafter, the processor 80 may select a target logical page LP that is to be subjected to the process, from the plurality of logical pages LP contained in the print data DP, in step S142. Specifically, the processor 80 may select the target logical page LP from the initial logical page LP in the plurality of logical pages LP contained in the print data DP.

Thereafter, the processor 80 may acquire the connected page number N1 and the page length DL of the target logical page LP from the attribute information INF in the print data DP, in step S143.

Thereafter, the medium page length detector 81 may detect the page length ML corresponding to the length of the target logical page LP in step S144. Specifically, for example, when the connected page number N1 of the target logical page LP is "2", the medium page length detector 81 may detect the page length ML of the two pages PP.

Thereafter, the position corrector 82 may calculate the correction value CLn on the basis of the page length DL and the page length ML in step S145. In one example, the correction value CLn may be a difference between the page length DL and the page length ML. Alternatively, in another example, the correction value CLn may be a difference between the page length DL and an average value of the plurality of detected page lengths ML.

Thereafter, in step S146, the processor 80 may generate the image data D1 of the target logical page LP. Specifically, the processor 80 may generate the image data D1 of the target logical page LP on the basis of the image data contained in the target logical page LP and contained in the print data DP.

Thereafter, in step S147, the logical page connector 83 may confirm whether the target logical page LP is the initial logical page LP in the plurality of logical pages LP in the print data DP. When the target logical page LP is the initial logical page LP, i.e., when "N" is determined in step S147, the logical page connector 83 may generate, in step S148, the print image data D2 containing the logical page LP corresponding to the foregoing initial logical page LP, on the basis of the image data D1 generated in step S146. Thereafter, the flow may proceed to step S153.

When the target logical page LP is not the initial logical page LP in step S147, i.e., when "N" is determined in step S147, the position corrector 82 may correct the print image data D2 by the correction value CLn calculated in step S145. Specifically, the position corrector 82 may correct the length of the last logical page LP contained in the print image data D2, by increasing or decreasing the margin at the rear end of the last logical page LP, on the basis of the correction value CLn. The image forming apparatus 202 is thus able to correct the writing position, on the recording medium 9, of the target logical page LP, by generating the correction value CLn on the basis of the detected value and performing feedback using the generated correction value CLn as described above.

Thereafter, the logical page connector 83 may confirm whether the connected page number N1 of the target logical page LP is smaller than the connected page number NPP in step S150.

When the connected page number N1 of the target logical page LP is equal to the connected page number NPP in step S150, i.e., when "N" is determined in step S150, the logical page connector 83 may add the target logical page LP after the last logical page LP contained in the print image data D2, in step S151. In other words, without performing the connection of the logical pages LP, the logical page connector 83 may not add the target logical page LP, as another logical page LP, after the last logical page LP contained in the print image data D2.

When the connected page number N1 of the target logical page LP is smaller than the connected page number NPP in step S150, i.e., when "Y" is determined in step S150, the logical page connector 83 may connect the target logical page LP to the last logical page LP contained in the print image data D2, in step S152. In other words, the logical page connector 83 may connect the image data D1 of the target logical page LP to the image data D1 of the last logical page LP contained in the print image data D2, thereby combining the target logical page LP and the last logical page LP contained in the print image data D2 into a single logical page LP.

Thereafter, the processor 80 may confirm whether processes for all of the logical pages LP contained in the print data DP have been completed in step S153. When the processes for all of the logical pages LP contained in the print data DP have not been completed yet, i.e., when "N" is determined in step S153, the flow may return to step S142, and the processes in steps S142 to S153 may be performed repeatedly until the processes for all of the logical pages LP are completed.

When the processes for all of the logical pages LP have been completed already in step S153, i.e., when "Y" is determined in step S153, the flow may be brought to an end.

Next, the operation of the image forming apparatus 202 is described referring to a specific but non-limiting example.

Figure 26:
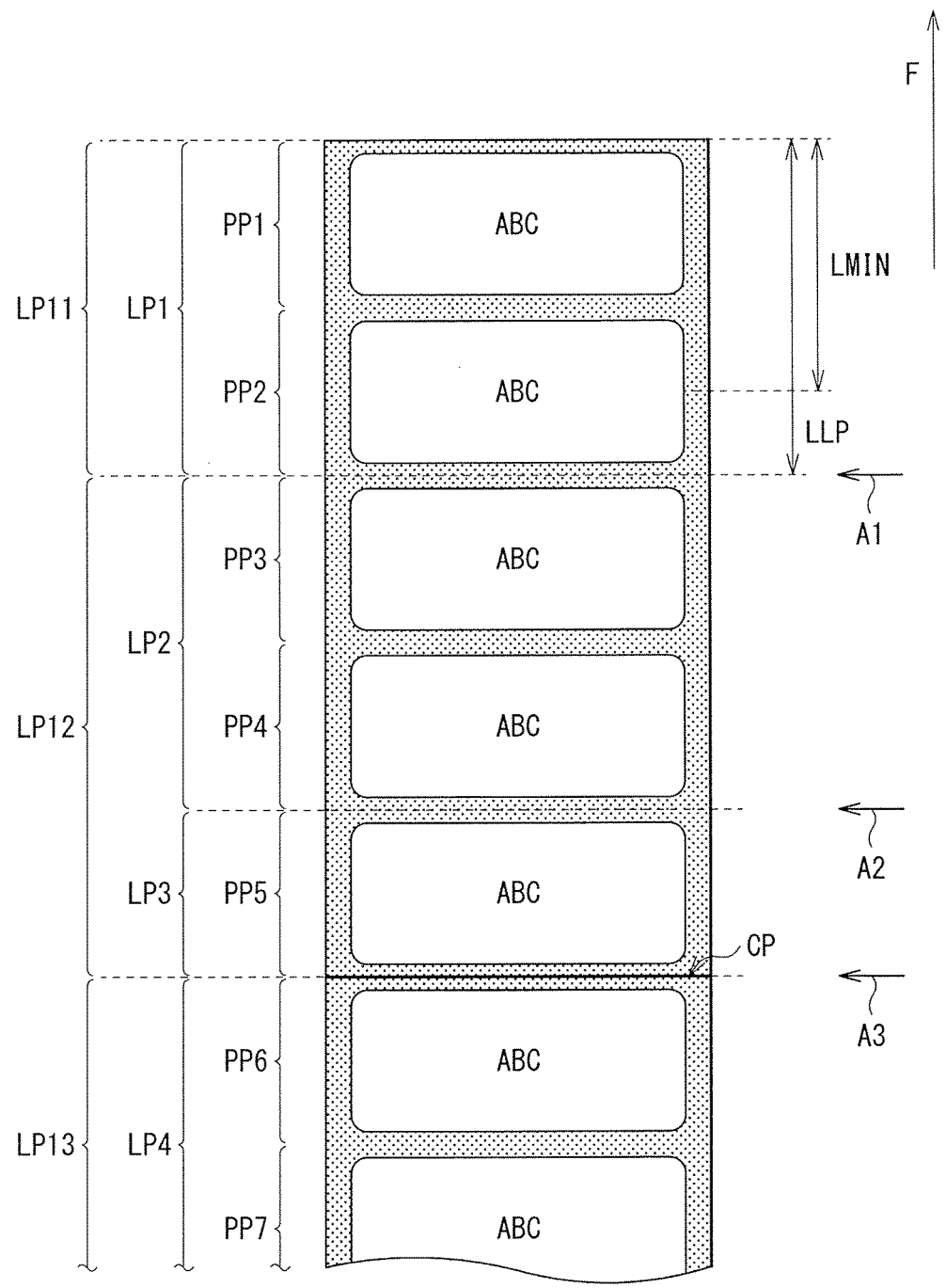
FIG. 26 describes the operation example of the processor illustrated in FIG. 21.

FIG. 26 schematically illustrates an example of a configuration of the logical page LP in the print image data D2 generated by the processor 80. In this example, the processor 80 generates the print image data D2 on the basis of the print data DP illustrated in FIG. 24. In this example case, the processor 80 generates a logical page LP11 on the basis of the logical page LP1, generates a logical page LP12 by connecting the two logical pages LP2 and LP3 to each other, generates a logical page LP13 on the basis of the logical page LP4, and generates a logical page LP14 by connecting the two logical pages LP5 and LP6 to each other. This operation is described below in detail.

First, the processor 80 acquires the connected page number NPP from the attribute information INF in the print data DP in step S141. In this example, the connected page number NPP is "2".

Thereafter, the processor 80 selects the initial logical page LP1 contained in the print data DP illustrated in FIG. 24 as the target logical page LP, in step S142. The connected page number N1 of the logical page LP1 is "2", and the page length DL of the logical page LP1 is "2×LPP" as acquired in step S143. The medium page length detector 81 detects the page length ML of two pages PP corresponding to the length of the logical page LP1 in step S144. The position corrector 82 calculates the correction value CLn on the basis of the page length DL and the page length ML in step S145. Thereafter, the processor 80 generates the image data D1 on the basis of the image data contained in the logical page LP1 in step S146. The logical page LP1 is the initial logical page LP, i.e., "Y" is determined in step S147. In step S148, the logical page connector 83 therefore generates the print image data D2 containing the logical page LP1 as the logical page LP11, on the basis of the image data D1 of the logical page LP1. The processes for all of the logical pages LP have not been completed, i.e., "N" is determined in step S153. The flow therefore proceeds to a process for a subsequent logical page LP.

Thereafter, the processor 80 selects the second logical page LP2 illustrated in FIG. 24 as the target logical page LP, in step S142. The connected page number N1 of the logical page LP2 is "2", and the page length DL of the logical page LP2 is "2×LPP" as acquired in step S143. The medium page length detector 81 detects the page length ML of two pages PP corresponding to the length of the logical page LP2 in step S144. The position corrector 82 calculates the correction value CLn on the basis of the page length DL and the page length ML in step S145. Thereafter, the processor 80 generates the image data D1 on the basis of the image data contained in the logical page LP2 in step S146. The logical page LP2 is not the initial logical page LP, i.e., "N" is determined in step S147. In step S149, the position corrector 82 corrects the writing start position by correcting the print image data D2 by means of the correction value CLn. This correction operation corresponds to a correction operation A1 illustrated in FIG. 26. Further, the value "2" of the connected page number N1 is the same as the value "2" of the connected page number NPP, i.e., "N" is determined in step S150. In step S151, the logical page connector 83 therefore adds, as the logical page LP12, the logical page LP2 that is the target logical page LP after the last logical page LP, i.e., the logical page LP11, contained in the print image data D2. The processes for all of the logical pages LP have not been completed yet, i.e., "N" is determined in step S153. The flow therefore proceeds to a process for a subsequent logical page LP.

Thereafter, the processor 80 selects the third logical page LP3 illustrated in FIG. 24 as the target logical page LP, in step S142. The connected page number N1 of the logical page LP3 is "1", and the page length DL of the logical page LP3 is "2×LPP" as acquired in step S143. The medium page length detector 81 detects the page length ML of a single page PP corresponding to the length of the logical page LP3 in step S144. The position corrector 82 calculates the correction value CLn on the basis of the page length DL and the page length ML in step S145. Thereafter, the processor 80 generates the image data D1 on the basis of the image data contained in the logical page LP3 in step S146. The logical page LP3 is not the initial logical page LP, i.e., "N" is determined in step S147. In step S149, the position corrector 82 therefore corrects the writing start position by correcting the print image data D2 by means of the correction value CLn. This correction operation corresponds to a correction operation A2 illustrated in FIG. 26. Further, the value "1" of the connected page number N1 is smaller than the value "2" of the connected page number NPP, i.e., "Y" is determined in step S150. In step S151, the logical page connector 83 therefore connects the logical page LP3 that is the target logical page LP, to the last logical page LP, i.e., the logical page LP12, contained in the print image data D2, thereby combining the logical page LP3 and the last logical page LP contained in the print image data D2 into a single logical page LP. In this example, the logical pages LP2 and LP3 may correspond to the "first logical page" in one specific but non-limiting embodiment of the technology. The processes for all of the logical pages LP have not been completed yet, i.e., "N" is determined in step S153. The flow therefore proceeds to a process for a subsequent logical page LP.

Thereafter, the processor 80 selects the fourth logical page LP4 illustrated in FIG. 24 as the target logical page LP, in step S142. The connected page number N1 of the logical page LP4 is "2", and the page length DL of the logical page LP4 is "2×LPP" as acquired in step S143. The medium page length detector 81 detects the page length ML of two pages PP corresponding to the length of the logical page LP4 in step S144. The position corrector 82 calculates the correction value CLn on the basis of the page length DL and the page length ML in step S145. Thereafter, the processor 80 generates the image data D1 on the basis of the image data contained in the logical page LP4 in step S146. The logical page LP4 is not the initial logical page LP, i.e., "N" is determined in step S147. In step S149, the position corrector 82 corrects the writing start position by correcting the print image data D2 by means of the correction value CLn. This correction operation corresponds to a correction operation A3 illustrated in FIG. 26. Further, the value "2" of the connected page number N1 is the same as the value "2" of the connected page number NPP, i.e., "N" is determined in step S150. In step S151, the logical page connector 83 therefore adds, as the logical page LP13, the logical page LP4 that is the target logical page LP after the last logical page LP, i.e., the logical page LP12, contained in the print image data D2. The processes for all of the logical pages LP have not been completed yet, i.e., "N" is determined in step S153. The flow therefore proceeds to a process for a subsequent logical page LP.

Thereafter, the processor 80 performs processes similar to the foregoing processes. Specifically, the processor 80 generates the logical page LP14 by connecting the two logical pages LP5 and LP6 to each other. Further, the process for the logical page LP6 is completed, and the processes for all of the logical pages LP are completed thereby, i.e., "Y" is determined in step S153.

Further, the image forming unit 20B may form an image on the recording medium, by using the logical pages LP contained in the print image data D2 as a reference, on the basis of the print image data D2 that is thus generated by the processor 80. Further, the cutter 15 may cut the recording medium 9 at the cutting position CP.

As described above, the image forming system 200 may cause the processor 80 of the image forming apparatus 202 to perform the connecting of the logical pages LP. The image forming system 200 is therefore able to cause the logical page length LLP to be longer than the minimum medium length LMIN as in the foregoing first and second example embodiments.

Moreover, the image forming system 200 may not cause the printer driver 143 of the host computer 201 to perform the connecting of the logical pages LP, but may cause the processor 80 of the image forming apparatus 202 to perform the connecting of the logical pages LP. Further, the processor 80 may correct the writing start position of each of the logical pages LP, by using the logical pages LP contained in the print data DP as a reference. Hence, the image forming system 200 is able to efficiently utilize the recording medium 9 without wasting the recording medium 9.

In other words, the recording medium 9 may be possibly wasted, for example, in a case where the host computer sequentially supplies a plurality of pieces of page data to the image forming apparatus as they are using a piece of page data as a unit in order of generation, and the image forming apparatus forms an image on the recording medium 9 on the basis of the supplied pieces of page data. Specifically, for example, when an interval in reception, by the image forming apparatus, of the pieces of page data is longer than a process time for performing the operation of forming an image on the recording medium 9 on the basis of the single piece of page data, the page data may not be fed fast enough for the image forming process to be performed properly. This may possibly result in presence of a blank page. Further, even in a case where the image forming operation is suspended and an error notification is performed for a user when the blank page is present, user friendliness may be lowered. Further, for example, even when the image forming apparatus receives data in a fine unit such as page data, the image forming apparatus may be unable to perform physical operations in accordance with the data in such a fine unit. As a result, a blank page may be possibly present. Non-limiting examples of the foregoing physical operations may include an operation of conveying the recording medium 9 along the conveyance path 8 and an operation of cutting the recording medium 9.

To address this, for example, it may be desired for the host computer to generate the logical page LP containing a plurality of pages PP and supply a plurality of logical pages LP to the image forming apparatus by using the logical page LP as a unit in order of the generation of the logical pages LP. Further, it may be desired for the image forming apparatus to form an image on the recording medium 9 on the basis of the received logical pages LP. It may be possibly difficult, however, for the image forming apparatus to correct the writing start position of the logical page LP when the host computer so performs adjustment that the number of the pages PP contained in the logical page LP is increased. Specifically, the image forming apparatus may correct the writing start position by using the logical page LP as a reference. Therefore, as the number of the pages PP contained in the logical page LP is increased, misalignment of the writing position may be greater in an accumulated manner. Hence, it may be possibly more difficult for the image forming apparatus to correct the writing start position.

In contrast, the image forming system 200 may not cause the printer driver 143 of the host computer 201 to perform the connecting of the logical pages LP, and may cause the processor 80 in the image forming apparatus 202 to perform the connecting of the logical pages LP. In other words, the printer driver 143 may not increase the number of the pages PP contained in the logical page LP. Further, the image forming apparatus 202 may correct the writing start position by using the logical page LP contained in the print data DP as a reference. Specifically, the image forming apparatus 202 may correct the writing start position by using the logical pages LP before the connecting, i.e., the logical pages LP1 to LP6, as a reference, as illustrated in FIG. 26. Accordingly, the image forming system 200 may correct the writing start position by using the logical pages LP before connecting the logical pages LP as a reference even when the connecting of the logical pages LP is performed. This suppresses an increase in misalignment of the writing start position. Hence, it is possible to appropriately correct the writing start position.

The image forming system 200 may involve an increase in communication load in communication between the host computer 201 and the image forming apparatus 202 at the time when the image forming apparatus 202 connects the logical pages LP to each other. The image forming apparatus 202, however, may connect the logical pages LP to each other only immediately before the cutting position CP. This allows for a decrease in average value of the communication load, compared to a case where the connecting of the logical pages LP is performed constantly, for example. Hence, it is possible to suppress the possibility that the image data may not be fed fast enough for the image forming process to be performed properly.

As described above, according to the third example embodiment, the printer driver of the host computer may not perform the connecting of the logical pages, and the processor of the image forming apparatus may perform the connecting of the logical pages. Further, the processor may correct the writing start position of each of the logical pages by using the logical page contained in the print data as a reference. Hence, it is possible to efficiently utilize the recording medium without wasting the recording medium.

Modification Example 3-1

Figure 27:
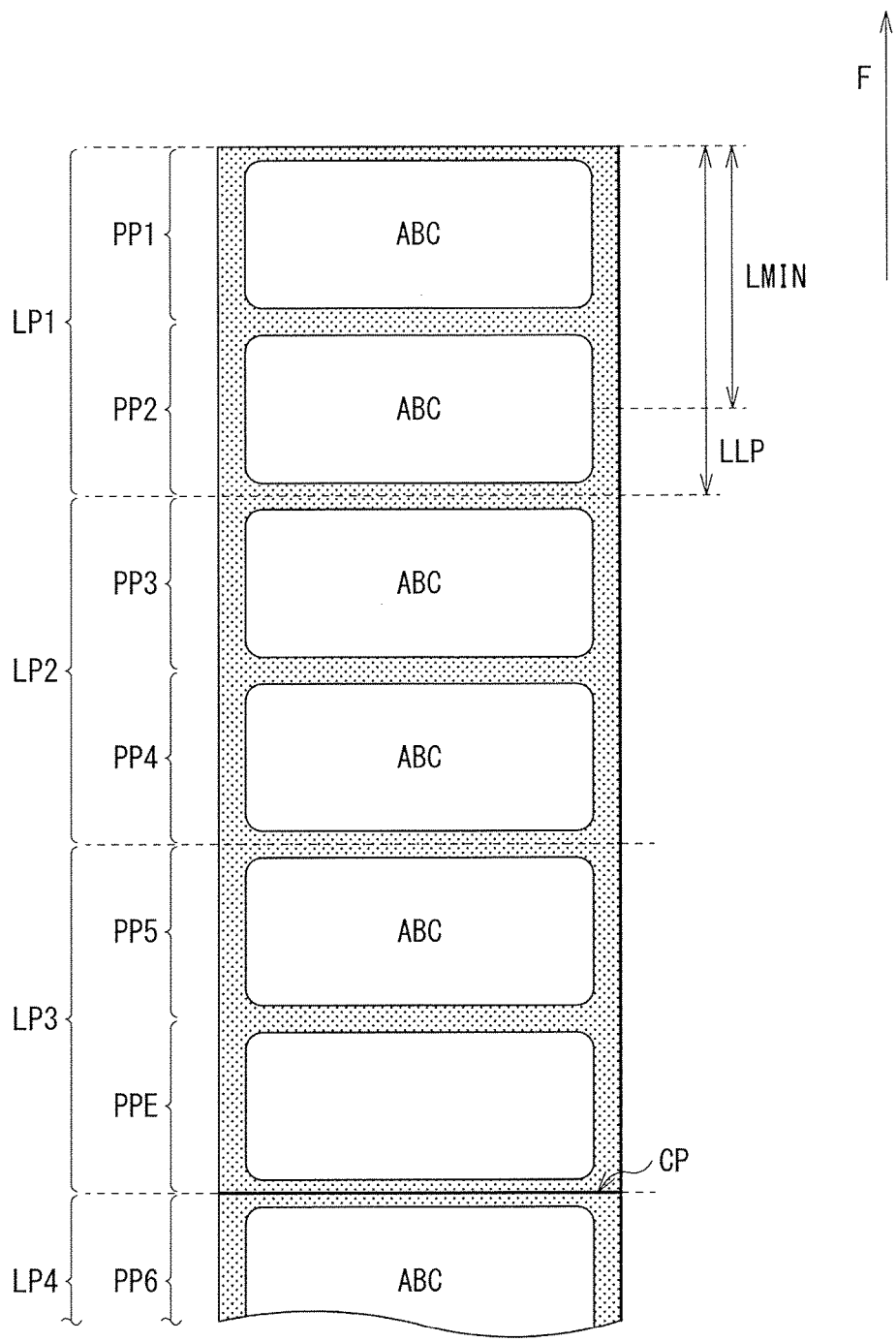
FIG. 27 describes an operation example of a printer driver according to a modification example.

In the foregoing third example embodiment, the image forming system 200 may cause the logical page length LLP of the logical page LP contained in the print data DP to be able to be shorter than the minimum medium length LMIN, for example, as the logical page length LLP of the logical page LP3 illustrated in FIG. 26; however, this is non-limiting. Alternatively, referring to FIG. 27, the logical page length LLP of the logical page LP contained in the print data DP may be constantly longer than the minimum medium length LMIN. An image forming system 200A according to Modification example 3-1 may include a host computer 201A and an image forming apparatus 202A. Referring to FIG. 27, a print data generator 150A of the host computer 201A may generate a logical page LP3 containing a single page PP5 and a single blank page PPE. Further, a processor 80A of the image forming apparatus 202A may detect that the logical page LP3 contains the blank page PPE. Further, the processor 80A may generate the logical page LP12 by connecting a portion, of the logical page LP3, corresponding to the page PP5, to the logical page LP2, as in the forgoing third example embodiment illustrated in FIG. 26.

The technology has been described above referring to the example embodiments and the modification examples thereof. However, the technology is not limited to the example embodiments and the modification examples described above, and is modifiable in various ways.

For example, the foregoing example embodiments and the foregoing modification examples are described referring to an example case where the roll paper may be used; however, this is non-limiting. Alternatively, any long recording medium may be used.

Moreover, for example, the foregoing example embodiments and the foregoing modification examples are described referring to an example case where an image is formed on the recording medium 9 by an electrophotographic scheme; however, this is non-limiting. Alternatively, an image may be formed by any scheme. Further, for example, the foregoing example embodiments and the foregoing modification examples are described referring to an example case where a color image is formed on the recording medium 9; however, this is non-limiting. Alternatively, a monochrome image may be formed.

Furthermore, the technology encompasses any possible combination of some or all of the various embodiments and the modifications described herein and incorporated herein.

It is possible to achieve at least the following configurations from the above-described example embodiments of the technology.

(1)

An information processor including:

an image data generating circuitry that includes a logical page generating circuitry and a page adjusting circuitry, and generates image data,
the logical page generating circuitry generating a plurality of logical pages each containing a plurality of pages,
the page adjusting circuitry adjusting number of pages of the plurality of pages contained in a first logical page of the plurality of logical pages,
the image data containing the plurality of logical pages; and
a communicator that transmits the image data to an image forming unit, the image forming unit being able to cut a recording medium by using the logical pages as a reference, and forming an image on the recording medium by using the logical pages as a reference.

(2)

The information processor according to (1), further including
a cutting interval setting circuitry that sets a cutting interval at which the recording medium is to be cut, wherein
the page adjusting circuitry adjusts the number of pages of the plurality of pages contained in the first logical page on a basis of the cutting interval.

(3)

The information processor according to (1) or (2), in which the page adjusting circuitry adjusts the number of pages of the plurality of pages contained in the first logical page and thereby causes the number of pages of the plurality of pages contained in the first logical page to be greater than number of pages of the plurality of pages contained in a second logical page of the plurality of logical pages.

(4)

The information processor according to (3), in which the number of pages of the plurality of pages contained in the second logical page is a predetermined number that is unique to the image forming apparatus.

(5)

The information processor according to (4), in which the predetermined number corresponds to a minimum medium length of the recording medium that is necessary for the image forming apparatus to convey the recording medium.

(6)

The information processor according to (1), in which the page adjusting circuitry adjusts number of pages of the plurality of pages contained in each of the plurality of logical pages.

(7)

The information processor according to (6), further including
a cutting interval setting circuitry that sets a cutting interval at which the recording medium is to be cut, wherein
the page adjusting circuitry adjusts the number of pages of the plurality of pages contained in each of the plurality of logical pages on a basis of the cutting interval.

(8)

The information processor according to (6) or (7), in which the page adjusting circuitry adjusts the number of pages of the plurality of pages contained in each of the plurality of logical pages and thereby causes the number of pages of the plurality of pages contained in each of the plurality of logical pages to be greater than a predetermined number that is unique to the image forming apparatus.

(9)

The information processor according to (8), in which the page adjusting circuitry adjusts the number of pages of the plurality of pages contained in the first logical page and thereby causes the number of pages of the plurality of pages contained in the first logical page to be greater than number of pages of the plurality of pages contained in a second logical page of the plurality of logical pages.

(10)

The information processor according to any one of (1) to (9), in which the image forming unit is an image forming apparatus that is provided outside the information processor and separately from the information processor.

(11)

The information processor according to any one of (1) to (9), further including the image forming unit.

(12)

An image forming method including:

generating, with an image data generating circuitry, image data, by causing the image data generating circuitry to generate a plurality of logical pages each containing a plurality of pages and adjust number of pages of the plurality of pages contained in a first logical page of the plurality of logical pages, the image data containing the plurality of logical pages;
cutting, with a cutter, a recording medium, the cutter being able to cut the recording medium by using the logical pages as a reference; and
forming, with an image forming unit, an image on the recording medium by using the logical pages as a reference.

(13)

An image forming system including:

an information processor; and
an image forming apparatus that forms an image on a recording medium,
the information processor including
a first image data generating circuitry that includes a logical page generating circuitry, and generates first image data, the logical page generating circuitry generating a plurality of logical pages each containing one or a plurality of pages that are, in number, equal to or smaller than a predetermined number, the first image data containing the plurality of logical pages, and
a first communicator that transmits the first image data to the image forming apparatus,
the image forming apparatus including
a second communicator that receives the first image data,
a second image data generating circuitry that includes a corrector and a page adjusting circuitry, and generates second image data on a basis of the first image data, the corrector correcting a length of each of the logical pages by using the logical pages contained in the first image data as a reference, the page adjusting circuitry adjusting number of pages of the one or the plurality of pages contained in a first logical page of the plurality of logical pages contained in the first image data,
a cutter that is able to cut the recording medium by using, as a reference, the logical pages contained in the second image data, and
an image forming unit that forms, on a basis of the second image data, an image on the recording medium by using, as a reference, the logical pages contained in the second image data.

(14)

The image forming system according to (13), in which
the recording medium has a plurality of labels that are provided side by side,
the image forming apparatus includes a detector that detects a pitch of the labels, and
the corrector corrects the length of each of the logical pages on a basis of a result of the detection performed by the detector.

(15)

The image forming system according to (13) or (14), in which the page adjusting circuitry adjusts the number of pages of the one or the plurality of pages contained in the first logical page, and thereby causes the number of pages of the one or the plurality of pages contained in the first logical page to be greater than number of pages of the one or the plurality of pages contained in a second logical page in the plurality of logical pages contained in the first image data.

(16)

The image forming system according to (15), in which the second logical page contains the one or the plurality of pages that are equal, in number, to the predetermined number.

(17)

The image forming system according to any one of (13) to (16), in which the page adjusting circuitry adjusts the number of pages of the one or the plurality of pages contained in the first logical page, and thereby causes the number of pages of the one or the plurality of pages contained in the first logical page to be greater than the predetermined number.

(18)

The image forming system according to any one of (13) to (17), in which the predetermined number is unique to the image forming apparatus.

(19)

The image forming system according to any one of (13) to (18), in which the cutter cuts the recording medium after the image forming unit completes formation of an image corresponding to the first logical page containing the one or the plurality of pages having the number of pages adjusted by the page adjusting circuitry.

(20)

An image forming apparatus including:
an image data generating circuitry that includes a logical page generating circuitry and a page adjusting circuitry, and generates image data,
the logical page generating circuitry generating a plurality of logical pages each containing a plurality of pages,
the page adjusting circuitry adjusting number of pages of the plurality of pages contained in a first logical page of the plurality of logical pages, the image data containing the plurality of logical pages;
a cutter that is able to cut a recording medium by using the logical pages as a reference; and
an image forming unit that forms, on the basis of the image data, an image on the recording medium by using the logical pages as a reference.

According to each of the information processor, the image forming apparatus, and the image forming method of the respective embodiments of the technology, the number of pages of the plurality of pages contained in the first logical page of the plurality of logical pages is adjusted. Hence, it is possible to efficiently utilize the recording medium.

According to the image forming system of the embodiment of the technology, the information processor generates the plurality of logical pages each containing the one or the plurality of pages that are, in number, equal to or smaller than the predetermined number. Further, the image forming apparatus adjusts the number of pages of the one or the plurality of pages, contained in the first logical page of the plurality of logical page, that are, in number, equal to or smaller than the predetermined number. Hence, it is possible to efficiently utilize the recording medium.

Each of the processor 70 and 80, the logical page connector 83, the print data generators 110 and 130, the page data connector 115, the logical page generator 112, the connected page number corrector 139, and the print data generator 150 is implementable by a circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of each of the foregoing units. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the foregoing units.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An information processor comprising:
an image data generating circuitry that includes a logical page generating circuitry and a page adjusting circuitry, and generates image data,
the logical page generating circuitry generating a plurality of logical pages each containing a plurality of pages,
the page adjusting circuitry adjusting number of pages of the plurality of pages contained in a first logical page of the plurality of logical pages,
the image data containing the plurality of logical pages;
a communicator that transmits the image data to an image forming unit, the image forming unit being able to cut a recording medium by using the logical pages as a reference, and forming an image on the recording medium by using the logical pages as a reference; and a cutting interval setting circuitry that sets a cutting interval at which the recording medium is to be cut, wherein the page adjusting circuitry adjusts the number of pages of the plurality of pages contained in the first logical page on a basis of the cutting interval.

2. The information processor according to claim 1, wherein the page adjusting circuitry adjusts the number of pages of the plurality of pages contained in the first logical page and thereby causes the number of pages of the plurality of pages contained in the first logical page to be greater than number of pages of the plurality of pages contained in a second logical page of the plurality of logical pages.

3. The information processor according to claim 2, wherein the number of pages of the plurality of pages contained in the second logical page is a predetermined number that is unique to the image forming apparatus.

4. The information processor according to claim 3, wherein the predetermined number corresponds to a minimum medium length of the recording medium that is necessary for the image forming apparatus to convey the recording medium.

5. The information processor according to claim 1, wherein the image forming unit is an image forming apparatus that is provided outside the information processor and separately from the information processor.

6. The information processor according to claim 1, further comprising the image forming unit.

7. An image forming system comprising:

an information processor; and an image forming apparatus that forms an image on a recording medium, the information processor including a first image data generating circuitry that includes a logical page generating circuitry, and generates first image data, the logical page generating circuitry generating a plurality of logical pages each containing one or a plurality of pages that are, in number, equal to or smaller than a predetermined number, the first image data containing the plurality of logical pages, and a first communicator that transmits the first image data to the image forming apparatus, the image forming apparatus including a second communicator that receives the first image data, a second image data generating circuitry that includes a corrector and a page adjusting circuitry, and generates second image data on a basis of the first image data, the corrector correcting a length of each of the logical pages by using the logical pages contained in the first image data as a reference, the page adjusting circuitry adjusting number of pages of the one or the plurality of pages contained in a first logical page of the plurality of logical pages contained in the first image data, a cutter that is able to cut the recording medium by using, as a reference, logical pages contained in the second image data, and an image forming unit that forms, on a basis of the second image data, an image on the recording medium by using, as a reference, the logical pages contained in the second image data.

8. The image forming system according to claim 7, wherein the recording medium has a plurality of labels that are provided side by side, the image forming apparatus includes a detector that detects a pitch of the labels, and the corrector corrects the length of each of the logical pages on a basis of a result of the detection performed by the detector.

9. The image forming system according to claim 7, wherein the page adjusting circuitry adjusts the number of pages of the one or the plurality of pages contained in the first logical page, and thereby causes the number of pages of the one or the plurality of pages contained in the first logical page to be greater than number of pages of the one or the plurality of pages contained in a second logical page in the plurality of logical pages contained in the first image data.

10. The image forming system according to claim 9, wherein the second logical page contains the one or the plurality of pages that are equal, in number, to the predetermined number.

11. The image forming system according to claim 7, wherein the page adjusting circuitry adjusts the number of pages of the one or the plurality of pages contained in the first logical page, and thereby causes the number of pages of the one or the plurality of pages contained in the first logical page to be greater than the predetermined number.

12. The image forming system according to claim 7, wherein the predetermined number is unique to the image forming apparatus.

13. The image forming system according to claim 7, wherein the cutter cuts the recording medium after the image forming unit completes formation of an image corresponding to the first logical page containing the one or the plurality of pages having the number of pages adjusted by the page adjusting circuitry.

14. An information processor comprising:

an image data generating circuitry that includes a logical page generating circuitry and a page adjusting circuitry, and generates image data, the logical page generating circuitry generating a plurality of logical pages each containing a plurality of pages, the page adjusting circuitry adjusting number of pages of the plurality of pages contained in a first logical page of the plurality of logical pages, the image data containing the plurality of logical pages;

a communicator that transmits the image data to an image forming unit, the image forming unit being able to cut a recording medium by using the logical pages as a reference, and forming an image on the recording medium by using the logical pages as a reference; and a cutting interval setting circuitry that sets a cutting interval at which the recording medium is to be cut, wherein the page adjusting circuitry adjusts the number of pages of the plurality of pages contained in each of the plurality of logical pages on a basis of the cutting interval.

15. The information processor according to claim 14, wherein the page adjusting circuitry adjusts the number of pages of the plurality of pages contained in each of the plurality of logical pages and thereby causes the number of pages of the plurality of pages contained in each of the plurality of logical pages to be greater than a predetermined number that is unique to the image forming apparatus.

16. The information processor according to claim 15, wherein the page adjusting circuitry adjusts the number of pages of the plurality of pages contained in the first logical page and thereby causes the number of pages of the plurality of pages contained in the first logical page to be greater than number of pages of the plurality of pages contained in a second logical page of the plurality of logical pages.

17. The information processor according to claim 14, wherein the image forming unit is an image forming apparatus that is provided outside the information processor and separately from the information processor.

18. The information processor according to claim 14, further comprising the image forming unit.

* * * * *